United States Patent [19]
Tang et al.

[11] Patent Number: 5,616,996
[45] Date of Patent: Apr. 1, 1997

[54] MODEL REFERENCE FOLLOWING COMMUTATION CIRCUIT AND ADJUSTING METHOD THEREOF

[75] Inventors: Shi-Ming Tang; Sang-Yong Lee, both of Puchon-shi, Rep. of Korea

[73] Assignee: Samsung Electronics Co., Ltd., Suwon, Rep. of Korea

[21] Appl. No.: 651,491

[22] Filed: May 22, 1996

[30] Foreign Application Priority Data

Aug. 28, 1995 [KR] Rep. of Korea ............ 95-26171

[51] Int. Cl.[6] .................................................. H02P 7/00
[52] U.S. Cl. ...................................... 318/439; 318/254
[58] Field of Search ............................ 318/254, 439, 318/138, 686, 696

[56] References Cited

U.S. PATENT DOCUMENTS

| | | | |
|---|---|---|---|
| 4,752,724 | 6/1988 | Radziwill et al. | 318/254 |
| 4,874,993 | 10/1989 | Tanaka et al. | 318/254 |
| 5,177,416 | 1/1993 | Inaji et al. | 318/254 |
| 5,221,881 | 6/1993 | Cameron | 318/439 X |
| 5,233,275 | 8/1993 | Danio | 318/439 X |
| 5,317,243 | 5/1994 | Cameron | 318/254 |

*Primary Examiner*—Jonathan Wysocki
*Attorney, Agent, or Firm*—Cushman Darby & Cushman IP Group Of Pillsbury Madison & Sutro LLP

[57] ABSTRACT

A circuit and method for controlling commutation of an electric motor includes first and second n-bit counters. The counters alternately serve as model reference and model following counters during alternate zero-cross intervals of a detected back-emf signal which is generated during rotation of the electric motor. The model following counter counts clock cycles occurring since a detected zero cross and continues counting until an optimal commutation switching point is detected, which is ideally located halfway through a commutation interval. A masking circuit is provided to mask spurious zero cross detections during a desired masking interval. A soft switching circuit determines commutation starting and ending points which are symmetrically located with respect to a center point of a commutation interval. Overflow protection circuits protect the counters from overflow during long commutation intervals and the like, and the internal clock is modulated to prevent overflow during certain operating conditions.

49 Claims, 21 Drawing Sheets

When second counter follows first counter

When first counter follows second counter

| Input | | Output |
|---|---|---|
| EN | D | Q |
| 0 | X | Q0 |
| 1 | 0 | 0 |
| 1 | 1 | 1 |

X : Don't care
Q : Next state output
Q0: Previous state output

MODEL REFERENCE FOLLOWING COMMUTATION CIRCUIT AND ADJUSTING METHOD THEREOF

BACKGROUND OF THE INVENTION (1) Field of the Invention

The present invention relates to a model reference following commutation circuit and an adjusting method thereof, and in particular, to a model reference following commutation circuit for driving a brushless direct current motor and an adjusting method thereof, which optimally controls a commutation delay time and a soft switching operation to mask spurious zero-cross detections and to optimize motor performance according to individual applications.

(2) Description of Related Art

In conventional circuits for driving brushless and sensorless direct current (DC) motors, it is generally desired that an actual back-emf zero-cross point be located out of phase from an commutation switching point. For a typical three-phase DC motor, the commutation switching point is ideally located 30 eletrical degrees from the zero-cross point. Advanced methods are needed to find the optimal switching point in order to drive a motor effectively.

In addition, multi-phase DC motors have induced load characteristics which are represented by a motor electrical constant, L/R. in general, because the time constant of a motor is longer than switching time of an electric device used to control commutation in the motor, such as a field effect transistor (FET), this time difference may cause switching noise, called spikes, and may even cause current re-circulation back to a power line. Moreover, spikes may adversely cause a comparator in a circuit to detect a false zero-cross of the back-emf. Therefore, masking is required to get rid of this disturbance.

Furthermore, soft switching is needed to adjusting a turn on/off time of a transistor controlling commutation and to eliminate the disturbance caused by spikes. As shown in FIGS. 1A and 1B, one can adjust the turn on/off time so that commutation starts from a certain point before the center point and continues to a certain point after the center point, and through this commutation a soft switching can be performed. In other words, the center point is ideally halfway through a commutation interval and aligned with a center reference axial, so that it is located symmetrically with the starting point and extended point at the left and right sides of the center reference axial.

Related art exists for finding an optimal switching point for commutation and for masking fake zero-cross points incorrectly detected due to noise caused by phase commutation. Techniques for detecting an optimal switching point and masking false detections using three counters are disclosed in U.S. Pat. No. 5,221,881, issued Jun. 22, 1993, and entitled "Method and Apparatus for Operating Polyphase DC Motors" and U.S. Pat. No. 5,317,243, issued May 31, 1994, and entitled "Method and Apparatus for Detecting Velocity Profiles of a Spinning Motor of a Polyphase DC Motor."

Among the three counters used in the related art, one is an up-counter that counts the zero-cross period. The other two are down-counters of which the first down-counter counts down to zero to generate a commutation delay signal; the second down-counter starts counting down after the first down-counter completed its counting to generate a masking time. When a zero-cross is detected, the counting result of the up-counter is loaded into both of the first and the second down-counters, then the up-counter is rested until a new commutation period.

Although the digital counters used in the above techniques are an advanced approach, there are four problems worth noting. The first problem is that the up-counter must load the counting results to the down-counter, and loading errors may occur.

The second problem is that the up-counter requires operations such as stopping, loading, resetting, and restarting of the counting, all of which are time-consuming. Therefore, these operations are performed in an off-line state and not in a real time signal process to prevent losing the track of the disk and to provide accurate control.

The third problem is that four different signals are needed to consecutively execute the procedures. However, these cannot be performed at the same time. If the pulse width of a control signal is 0.01 µs, from stop counting to restart counting, approximately 0.04 µs is required to issue the signals. This 0.04 µs is wasted, and when performed off-line, may result in lost tracking. Furthermore, miscommunication for 0.04 µs is caused while the period counter counts zero-crossings, which affects the rotation speed.

And the fourth problem is that it is difficult to find the rate of acceleration for the motor. For this purpose, SGS-Thomson uses an additional N+1 bits counter to control the clock frequency for the mask and delay counters based on the detected rate of acceleration. However, this is almost useless in high-density disk drive (HDD) applications, because in steady states, the motor speed is locked up to be quite stable, and the deviation of rotor velocity is typically less than 0.05%, which is practically negligible and difficult to measure.

In order to solve these problems, a conventional circuit, using a delay including at least one resistor-capacitor, is disclosed in U.S. Pat. No. 5,233,275, issued Aug. 3, 1993, and entitled "A Simplified Sensorless DC Motor Commutation Control Circuit Using Analog Timing Techniques."

However, as is known, once a resistor-capacitor RC constant time is set, there is no way that one can change this time constant during motor operations. For both low and high frequency motor rotation speeds, this fixed time constant may be neither sufficient nor appropriate for the dynamic motor commutation. In other words, a user must always take the trouble to find an optimal value for their type of motors. That includes the difficulty in deciding upon a set-of values for the resistor and capacitor according to the un-unified motor parameters.

Accordingly, to solve the above-mentioned problems, a circuit for adjusting the commutation delay time comprising a feedback circuit between the motor and the driver, is introduced in U.S. Pat. No. 5,285,135, issued Feb. 8, 1994, and entitled "Automatic Adjustment of Commutation Delay for Brushless DC Motor for Improved Efficiency." This circuit adjusts the commutation delay by performing a transfer function to modify a signal for adjusting the delay time. However, detecting the center position using that circuit without a position sensor is not an easy task. And, if a position sensor or other hardware is used, it could make the drive circuit more complicated in terms of the electronic components of the drive IC either internally or externally.

SUMMARY OF THE INVENTION

Accordingly, it is an object of the present invention to overcome the above-described problems of the conventional commutation circuits.

It is another object of the present invention to provide a circuit and method for controlling commutation in an electric motor which reliably detects an optimal commutation switching point.

It is another object of the present invention to provide a circuit and method for controlling commutation in an electric motor which enables flexible fine tuning of an optimal commutation switching point which is delayed from a detected zero crossing of a back-emf signal.

It is another object of the present invention to provide a circuit and method for controlling commutation in an electric motor which prevents incorrect detections of spurious back-emf zero crossings, caused by switching noise for example.

It is another object of the present invention to provide a circuit and method for controlling commutation in an electric motor which enables soft-switching of an output stage switching device in order to reduce a di/dt ratio and to eliminate the need for a snubber circuit.

It is another object of the present invention to provide a circuit and method for controlling commutation in an electric motor which flexibly permits user to control a commutation starting and ending point which are symmetrically located with respect to a commutation interval center point.

In order to achieve these and other objects, a circuit for controlling commutation of an electric motor includes first and second n-bit counters. The counters alternately serve as model reference and model following counters during alternate zero-cross intervals of a detected back-emf signal which is generated during rotation of the electric motor. The model following counter counts clock cycles occurring since a detected zero cross and continues counting until an optimal commutation switching point is detected, which is ideally located halfway through a commutation interval. A masking circuit is provided to mask spurious zero cross detections during a desired masking interval. A soft switching circuit determines commutation starting and ending points which are symmetrically located with respect to a center point of a commutation interval. Overflow protection circuits protect the counters from overflow during long commutation intervals and the like, and the internal clock is modulated to prevent overflow during special circumstances.

DETAILED DESCRIPTION OF THE PREFERRED EMBODIMENTS

Hereinafter, a preferred embodiment of the present invention will be described in detail with reference to the accompanying drawings.

Figure 2:
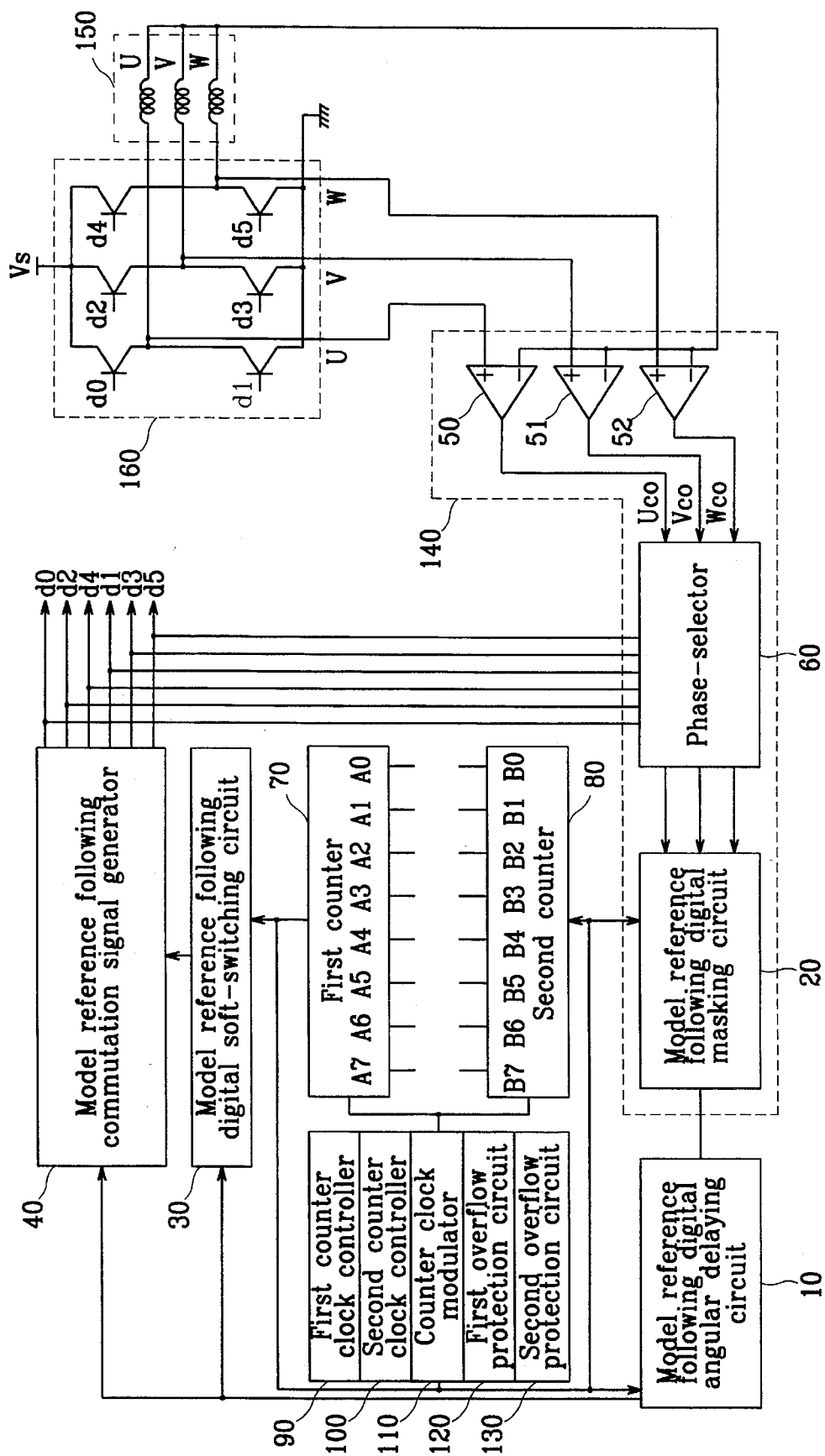
FIG. 2 is a block diagram of a model reference following commutation circuit according to a preferred embodiment of the invention.

A model reference following commutation circuit according to the present invention is illustrated in FIG. 2. In the circuit, first and second 8-bit counters 70 and 80 count a commutation interval of the back-emf generated in a rotating motor 150. A digital angular delaying circuit 10 detects an optimal switching point, a center point, by delaying a digital angle after detecting a zero-cross point with the counting results of the counters 70 and 80. A digital masking circuit 20 masks a spurious zero-cross point which is incorrectly detected after phase commutation by the two counters 70 and 80 incorporated within the digital angular delaying circuit 10. A digital soft-switching circuit 30 properly controls the turn on/off time of the devices in the motor driving output stage 160, by a continuous soft switching from somewhere before the center point to somewhere after the center point, thereby reducing the ratio of di/dt and avoiding current re-circulation back to the power line caused by a spike, and eliminating the need for a snubber circuit.

A signal generator 40 includes a six-bit shift register and generates commutation sequence signals of six states to the motor driving output stage 160. Back-emf comparators 50, 51, and 52 receive an amplified back-emf as a non-inverse (+) input, receive a common voltage as an inverse input (−), and output after changing the voltage level of back-emf to Uco, Vco, and Wco from 12 V to 5 V. A phase selector 60 receives a commutation signal outputted by the signal generator 40, and outputs to the digital angular masking circuit 20 after selecting a phase of the inputted signal. First and second counter clock controlling circuits 90 and 100 adjust the counter clock signals to be operated alternately at the rising edge and the falling edge of the zero-cross inputted from the model reference following digital masking circuit 20 by the first and a second counters 70 and 80. First and second overflow protection circuits 120 and 130 protect from a counter overflow that may be caused during a long commutation interval, due to a low rotating speed of the motor. A counter clock modulating circuit 110 outputs after modulating by dividing a counter clock into ½, ¼, ⅛ through a 3-bit shift counter.

Figure 3:
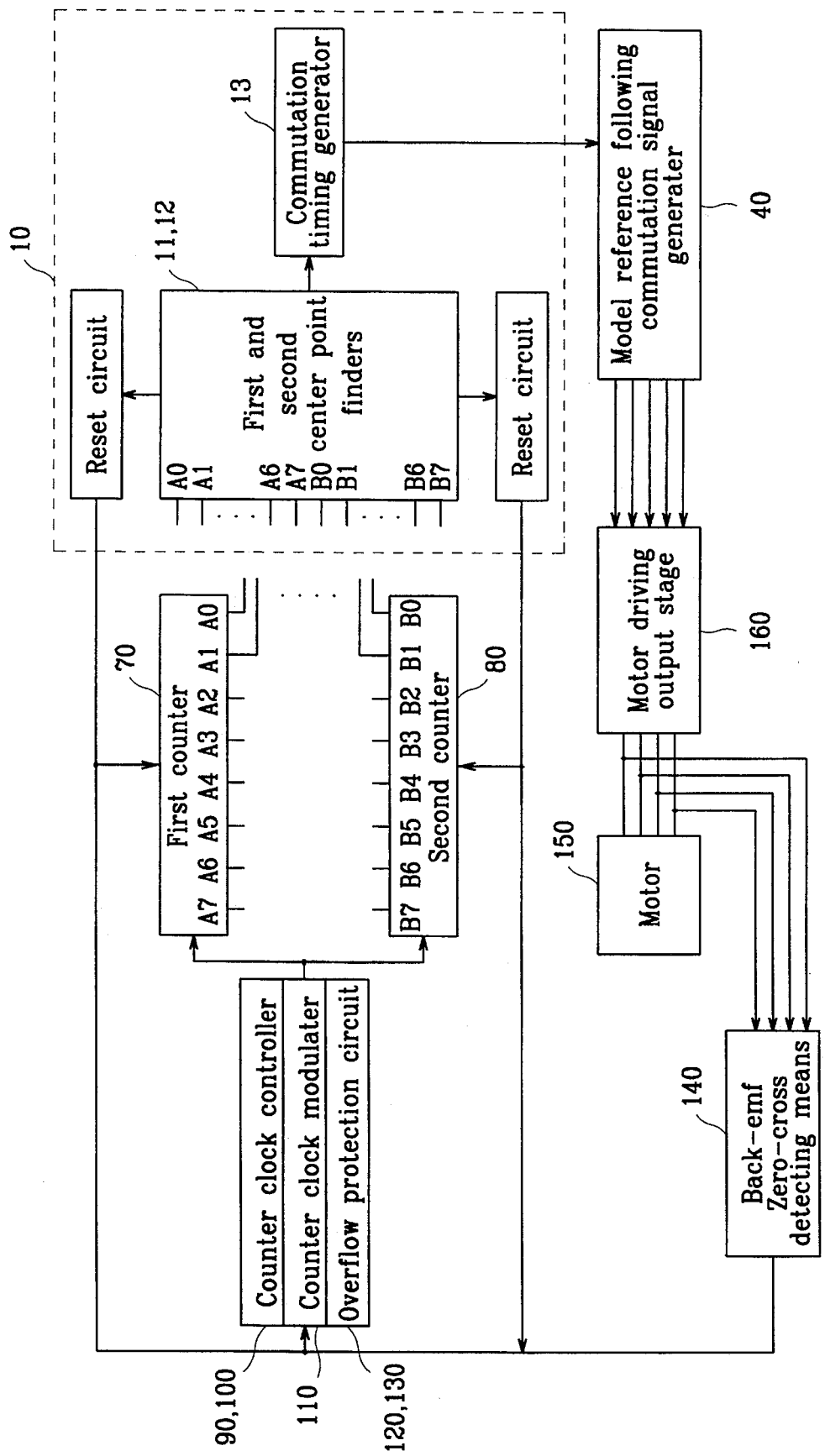
FIG. 3 is a block diagram of a digital angular delaying circuit in a model reference following commutation circuit according to a preferred embodiment of the invention.

A digital angular delaying circuit 10 according to the present invention is illustrated in FIG. 3. In the circuit, first and second center point detectors 11 and 12 detect a center point using the eight-bit counting results A and B of the counters 70 and 80. A commutation timing generator 13 receives a signal outputted from the center point detectors 11 and 12, generates a timing signal for setting a next commutation point, and outputs it to the model reference following commutation signal generator.

Figure 4:
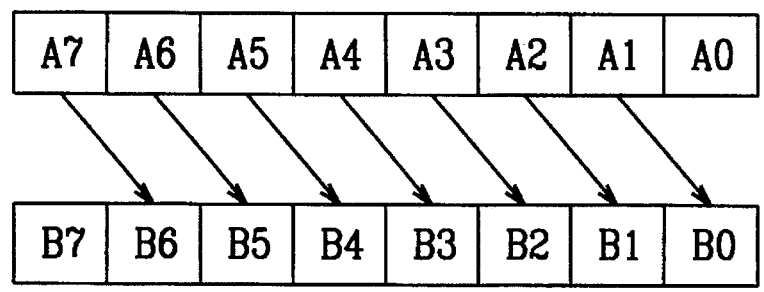
FIG. 4 is a circuit diagram of a first point detector according to a preferred embodiment of the invention when a first counter is used as the model reference.
Figure 4:
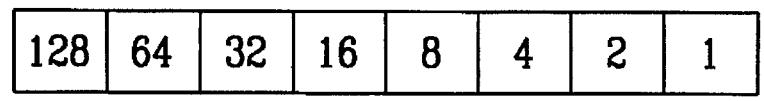
Figure 4:
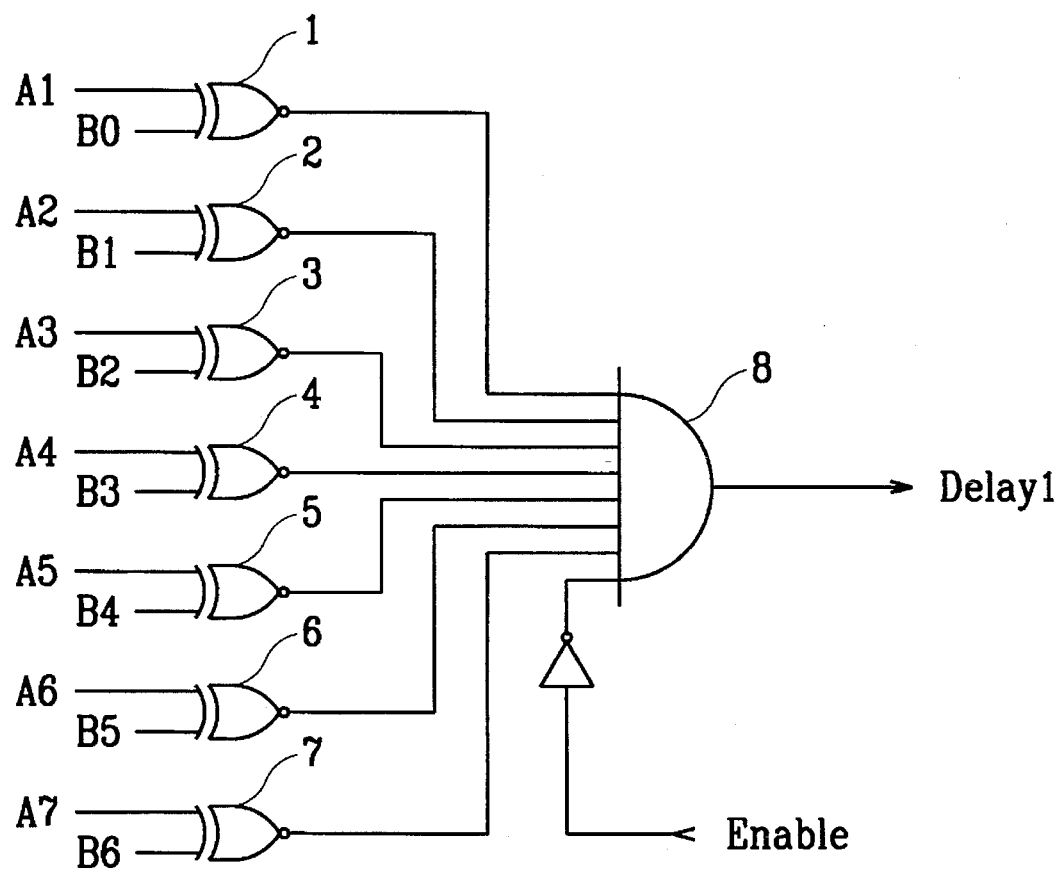

As shown in FIG. 4, the first center point detector 11 includes EX-NOR gates 1 to 7 which receive pairs of the first and the second counters 70 and 80 bits A1 and B0, A2 and B1, . . . and A7 and B6 in case the first counter 70 is a model reference, and outputs after performing an EX-NOR function. A multi-input AND gate 8 receives the outputs of the EX-NOR gates 1 to 7 and an enable signal generated after the speed is locked up, and generates and outputs a first delay signal (delay 1) after performing an AND function.

Figure 5:
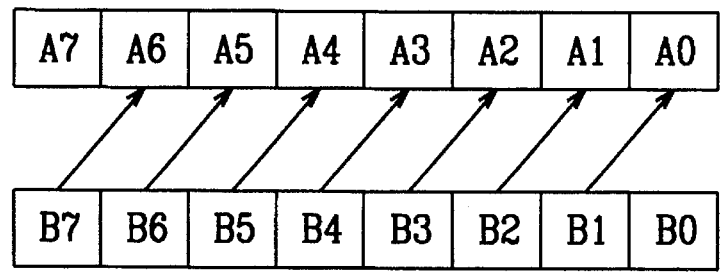
FIG. 5 is a circuit diagram of a second center point detector according to a preferred embodiment of the invention when a second counter is used as the model reference.
Figure 5:
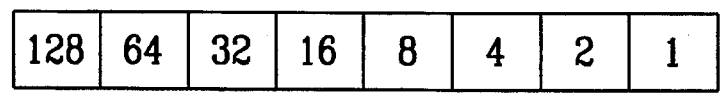
Figure 5:
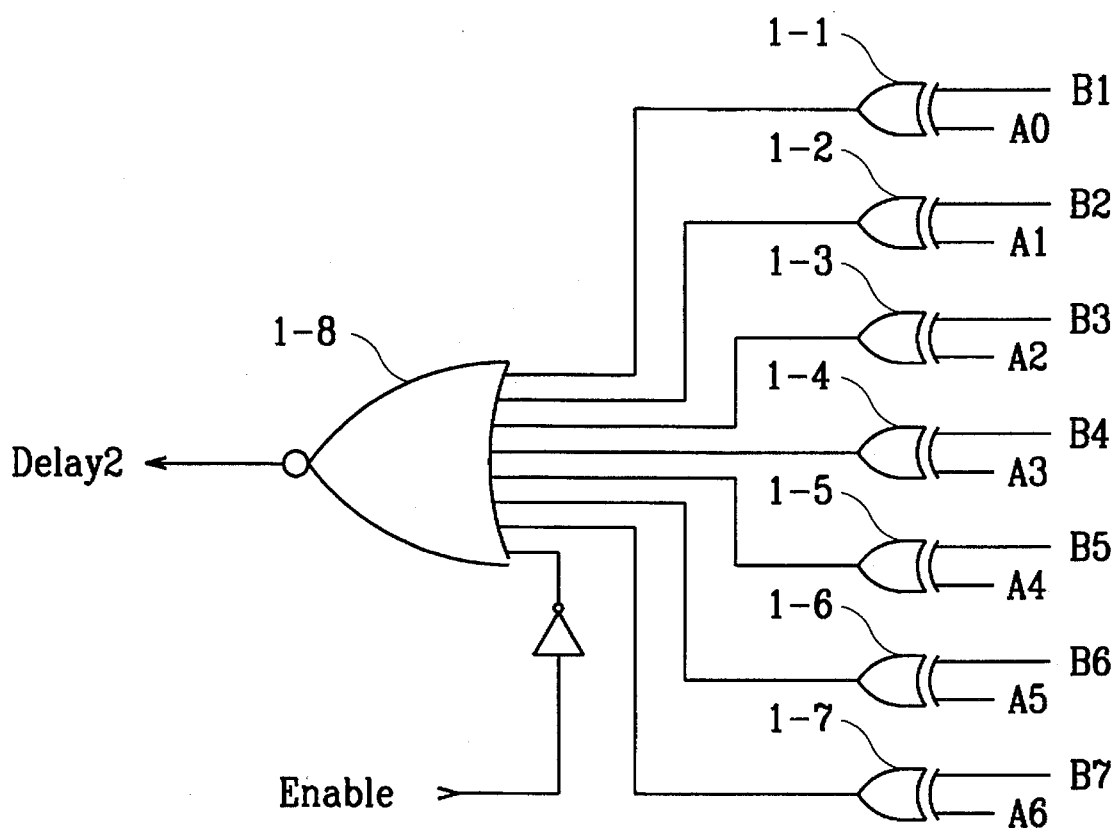

As illustrated in FIG. 5, the second center point detector 12 includes EX-OR gates 1-1 to 1-7 which receive pairs of the first and the second counters 70 and 80 bits B1 and A0, B2 and A1, and B7 and A6 in case the second counter 80 is a model reference, and outputs after performing an EX-OR function. A NOR gate 1-8 receives the output of the EX-OR gates 1-1 to 1-7 and an enable signal, and generates and outputs a second delay signal (delay 2) after performing a NOR function.

Figure 6:
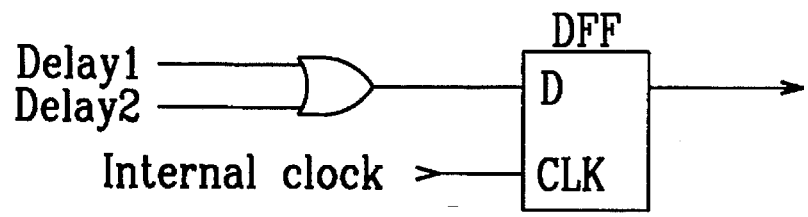
FIG. 6 is a circuit diagram of a commutation timing generator according to a preferred embodiment of the invention.

As illustrated in FIG. 6, the commutation timing generator 13 includes a DFF (D-Flip-Flop), which receives a signal D from an OR gate which outputs the OR result of two signals (delay1, delay2) outputted from the first and the second center point detectors 11 and 12, makes an internal clock signal, such as the signal supplied to the first and the second counters 70 and 80, of a clock input CLK, generates a commutation timing signal synchronized with the inputted internal clock signal, and outputs to the commutation signal generator 40.

Figure 8:
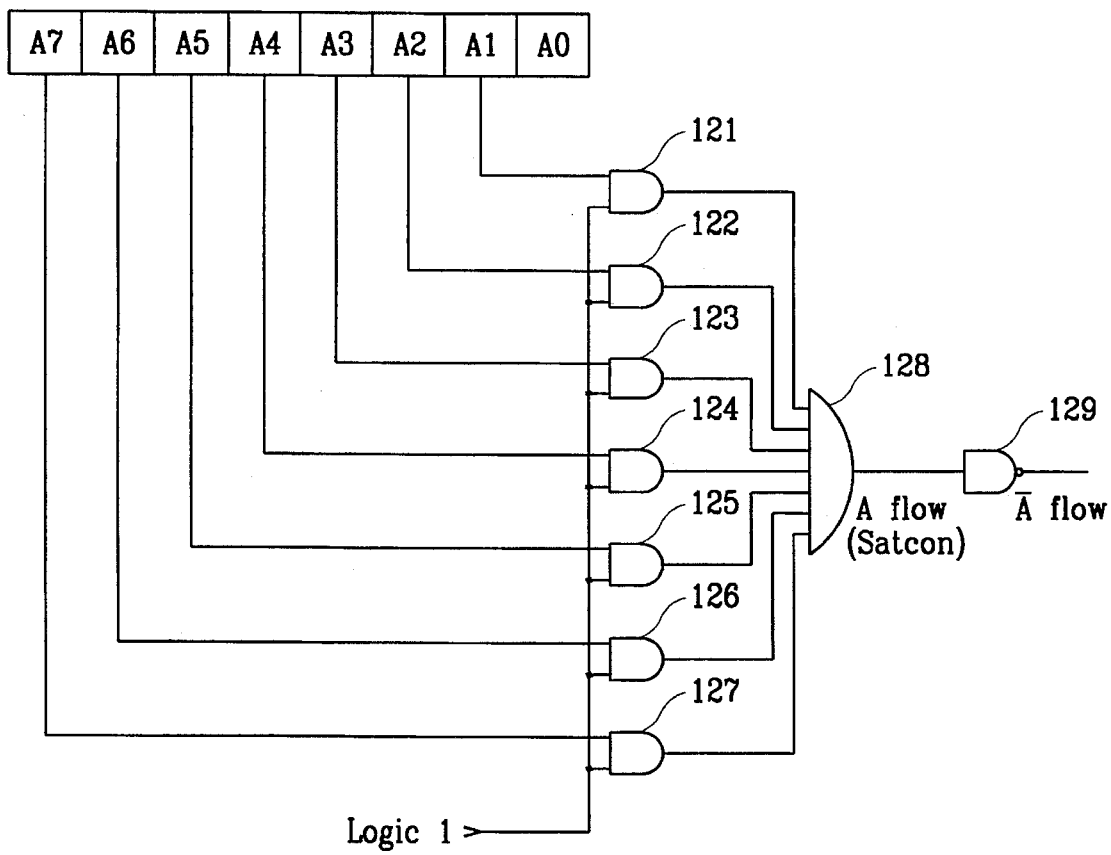
FIG. 8 is a circuit diagram of a first overflow protection circuit according to a preferred embodiment of the invention.

The first overflow protection circuit 120 is illustrated in FIG. 8. In the circuit, AND gates 121 to 127 input the first counter 70 bits A7 to A1, and receive a logic 1 as a common input, and then perform an AND function. A multi-input AND gate 128 receives the outputs of each AND gate 121 to 127, performs an AND function, generates and outputs a first overflow protecting signal (A flow). An inverter 129 outputs an inverse signal (inv(A) flow) of the multi-input AND gate 128.

Figure 9:
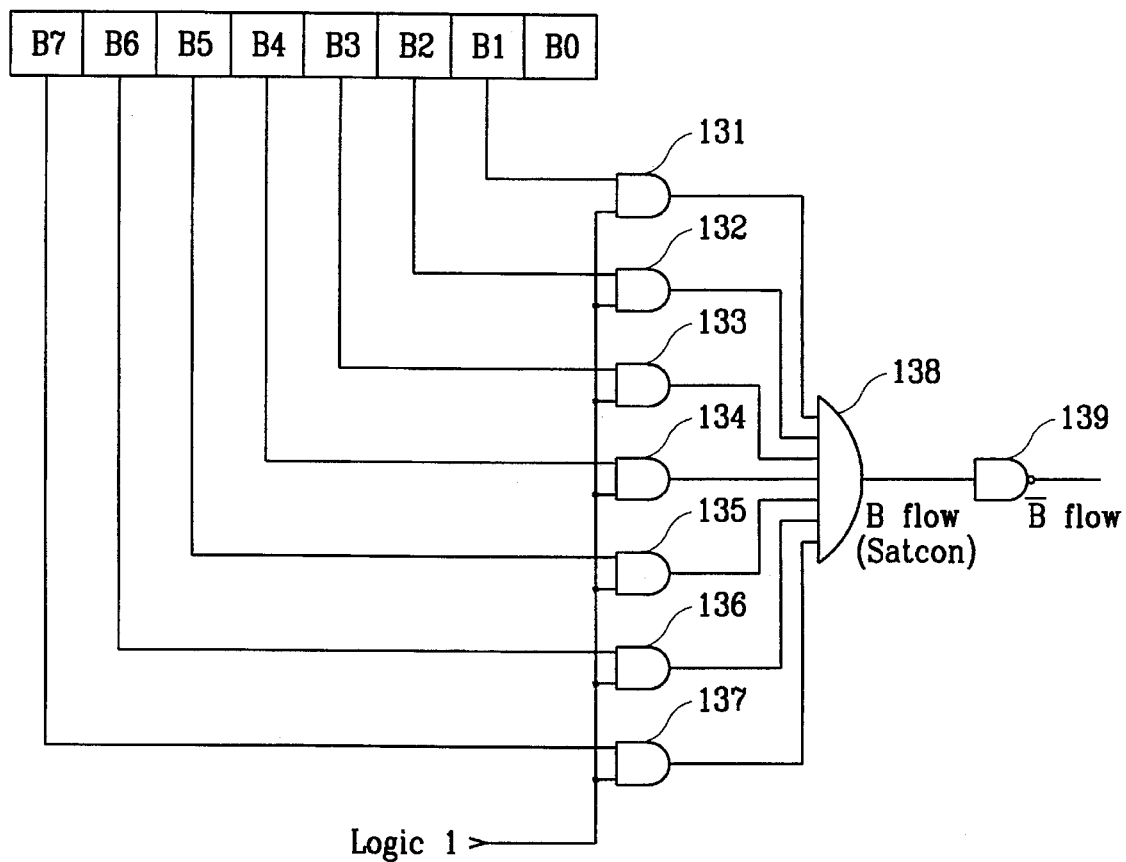
FIG. 9 is a circuit diagram of a second overflow protection circuit according to a preferred embodiment of the invention.

The second overflow protection circuit 130 is illustrated in FIG. 9. In the circuit, AND gates 131 to 137 input the second counter 80 bits B7 to B1, and receive a logic 1 as a common input, and perform an AND function. A multi-input AND gate 138 receives an output of each AND gate 131 to 137, performs an AND function, generates and outputs a second overflow protecting signal (B flow). An inverter 139 outputs an inverse signal (inv(B) flow) of the multi-input AND gate 138.

Figure 10:
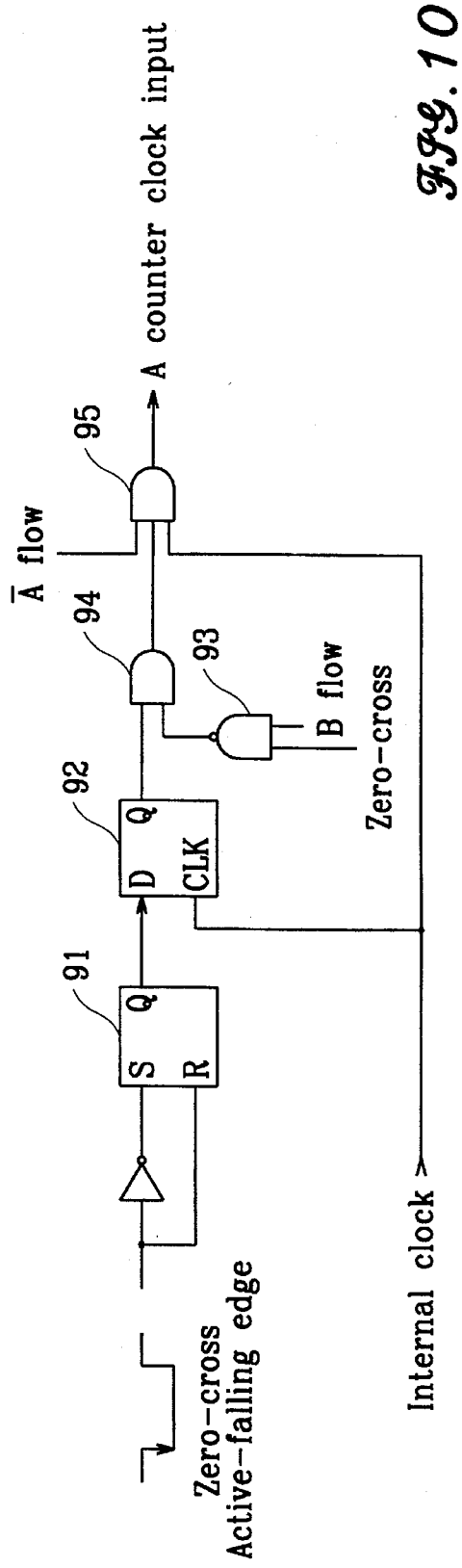
FIG. 10 is a circuit diagram of a first counter clock controlling circuit according to a preferred embodiment of the invention.

The first counter clock controlling circuit 90 is illustrated in FIG. 10. In the circuit, a RS-Flip-Flop 91 receives the falling edge and the inverse signal of the zero-cross signal outputted from the zero-cross detector 140 as the two inputs R and S, respectively, and outputs a logic gate driving signal of active-high level in the section of active-low of the inputted zero-cross signal. A D-Flip-Flop 92 receives the output Q of the RS-Flip-Flop 91 as an input D and receives an internal clock signal of a clock input CLK, and outputs a synchronized gate driving signal therewith. A NAND gate 93 receives the zero-cross signal and an output (B flow) of the second overflow protection circuit 130, and outputs the signals after performing a NAND function. An AND gate 94 receives the output Q of D-Flip-Flop 92 and an output of the NAND gate 93, and outputs after performing an AND function. An AND gate 95 receives the outputs of the AND gate 94, and the internal clock signal and a signal (inv(A) flow) outputted from the first overflow protection circuit 120, and generates and outputs a clock signal as a clock input to the first counter clock 70 after performing an AND function.

Figure 11:
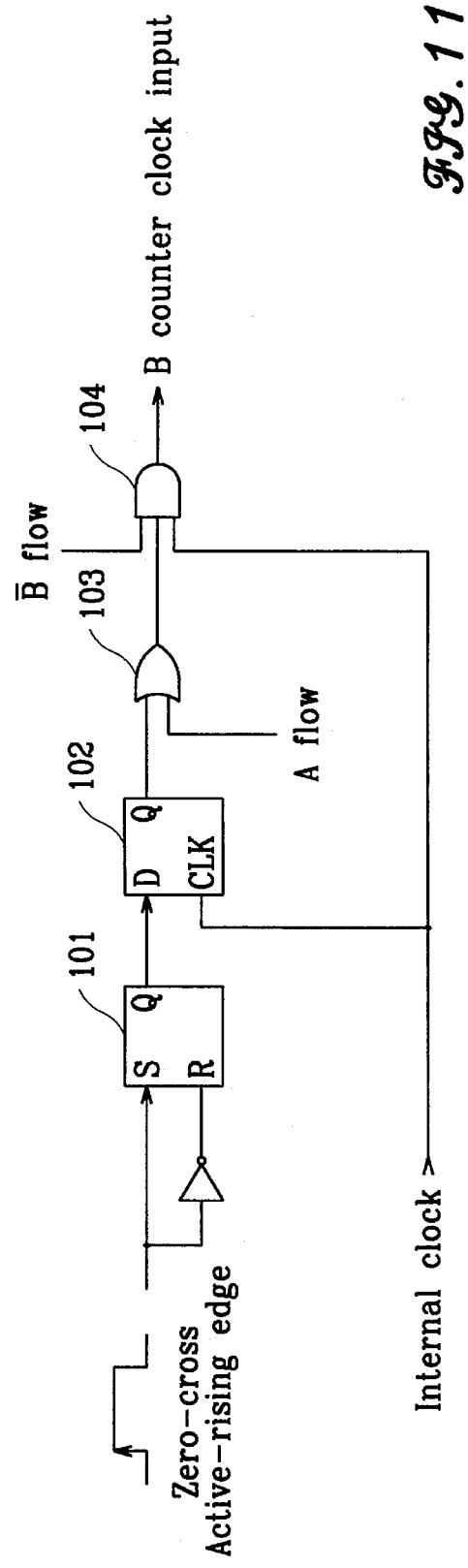
FIG. 11 is a circuit diagram of a second counter clock controlling circuit according to a preferred embodiment of the invention.

The second counter clock controlling circuit 100 is illustrated in FIG. 11. In the circuit, a RS-Flip-Flop 101 receives a rising edge and the inverse signal of the zero-cross signal outputted from the zero-cross detector 140 as its two inputs S and R, respectively, and outputs a logic gate driving signal of active-high level in the section of active-high of the inputted zero-cross signal. A D-Flip-Flop 102 receives the output Q of the D-Flip-Flop 101 as an input D and receives the output of the internal clock signal of a clock input CLK, and outputs a synchronized gate driving signal therewith. An OR gate 103 receives the output Q of the D-Flip-Flop 102 and a signal (A flow) of the first overflow protection circuit 120, and outputs the signals after performing an OR function. An AND gate 104 receives the outputs of the OR gate 103, the internal clock signal and the signal (inv(B) flow) of the second overflow protection circuit 130, performs an AND function, and generates and outputs a clock signal as a clock input to the second counter clock 80 after performing an AND function.

Figure 12:
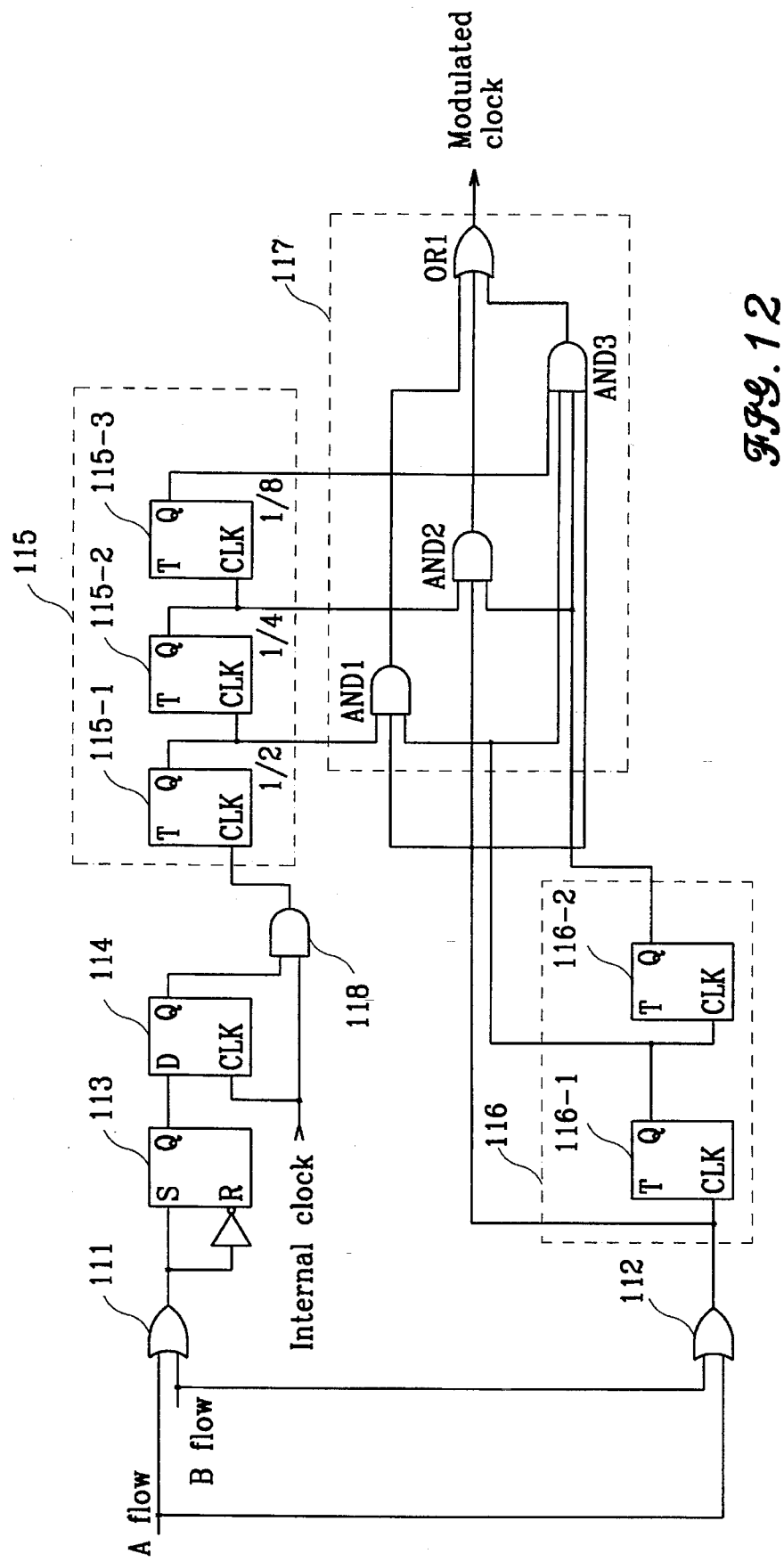
FIG. 12 is a circuit diagram of a counter clock modulating circuit according to a preferred embodiment of the invention.

The counter clock modulating circuit 110 is illustrated in FIG. 12. In the circuit, OR gates 111 and 112 receive the outputs (A flow and B flow) of the first and the second overflow protection circuits 120 and 130 and output after performing an OR function. A RS-Flip-Flop 113 receives the output signal of the OR gate 111 and the inverse signal of two inputs S and R, and outputs a trigger signal when an overflow is generated in the first or second counters 70 and 80. A D-Flip-Flop 114 receives the output Q of the RS-Flip-Flop 113 and receives the internal clock signal of a clock input CLK, and outputs a synchronized trigger signal therewith. An AND gate 118 receives the output Q of the D-Flip-Flop and the internal clock signal and outputs a final trigger signal when the two inputted signals are at a high level. A 3-bit shift counter 115 receives the output of the AND gate 118 of a clock input, and outputs after dividing the inputted clock signal by ½, ¼, and ⅛. A selector 116 receives the output of the OR gate 112 of a clock input CLK and counts it to select each output (divided by ½, ¼, and ⅛) of the shift 3-bit shift counter 115. A modulated clock signal generator 117 receives the output signal (divided by ½, ¼ and ⅛) of the 3-bit shift counter 115, and the selector 116, and the OR gate 112, and outputs after selecting a modulated clock signal when an overflow is generated in the first or the second counter.

The 3-bit shift counter 115 includes three T-Flip-Flops 115-1 to 115-3 which make an output of previous terminal of a clock input CLK, and outputs after dividing.

The selector 116 includes two T-Flip-Flops 116-1, 116-2 which make an output of a previous clock input CLK, and which count to select each output terminal of the 3-bit shift counter 115.

The modulated clock signal generator 117 includes a first AND gate AND1 which receives the outputs of the T-Flip-Flops 115-1, 116-1 and the OR gate 112 and outputs after performing an AND function. A second AND gate AND2 receives the outputs of the T-Flip-Flops 115-2, 117 and the OR gate 112 and outputs after performing an AND function. A third AND gate AND3 receives the outputs of the T-Flip-Flops 115-3, 116, and 117 and the OR gate 112 and outputs after performing an AND function. An OR gate OR1 receives the output of the AND gates AND1 to AND3 and outputs after performing an OR function.

Figure 15:
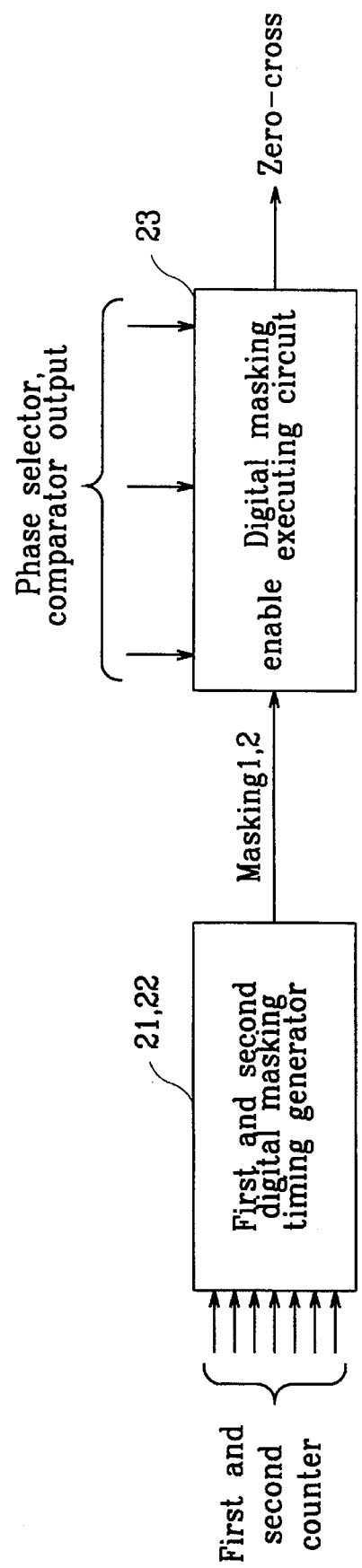
FIG. 15 is a block diagram showing a digital masking circuit of a model reference following commutation circuit according to a preferred embodiment of the invention.

A digital masking circuit 20 of the model reference following commutation circuit according to the preferred embodiment of the invention is illustrated in FIG. 15. In the circuit, first and second digital masking timing generators 21 and 22 receive the outputs of first and second counters 70 and 80, assemble the inputted bit signals, and generate and output first and second digital masking time signals (masking1, masking2). A digital masking executing circuit 23 receives the signals outputted from the digital masking timing generators 21 and 22, the phase selector 60, and the comparators 50 to 52, masks for the inputted masking time, and outputs a zero-cross signal.

Figure 16:
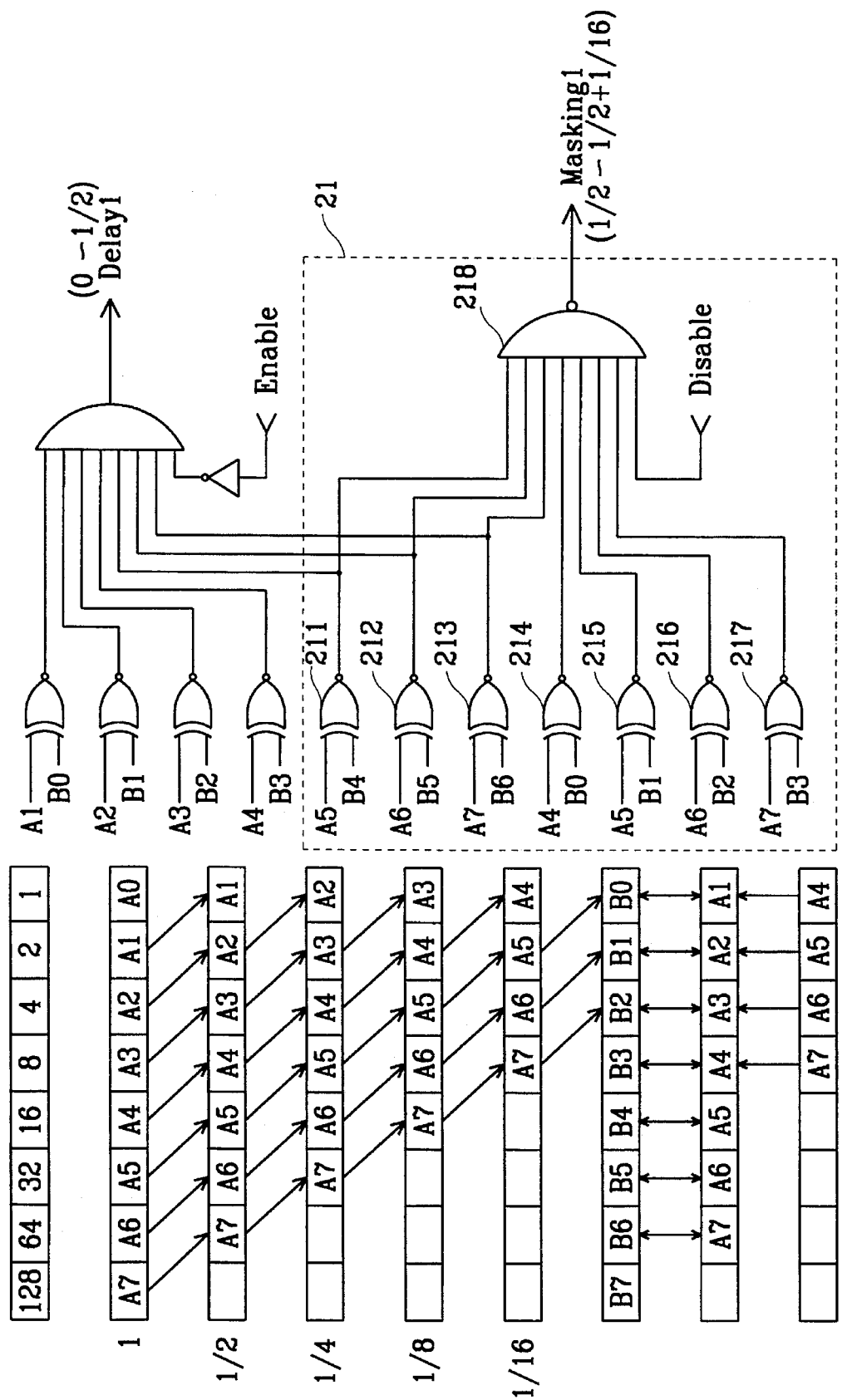
FIG. 16 is a circuit diagram of a center point detector and a digital masking timing generator according to a preferred embodiment of the invention in a case where a second counter follows a first counter.

The first digital masking timing generator 21 is illustrated in FIG. 16. In the circuit, EX-NOR gates 211 to 217 receive pairs of the first and the second counters 70 and 80 bits A5 and B4, A6 and B5, A7 and B6, and A4 and B0, A5 and B1, A6 and B2, A7 and B3 as each input, in case the first counter 70 is a model reference, and outputs after performing an EX-NOR function. A multi-input NAND gate 218 receives outputs of each of the EX-NOR gates 211 to 217 and a disable signal, performs an AND function, generates a first masking signal (masking1) and outputs.

Figure 17:
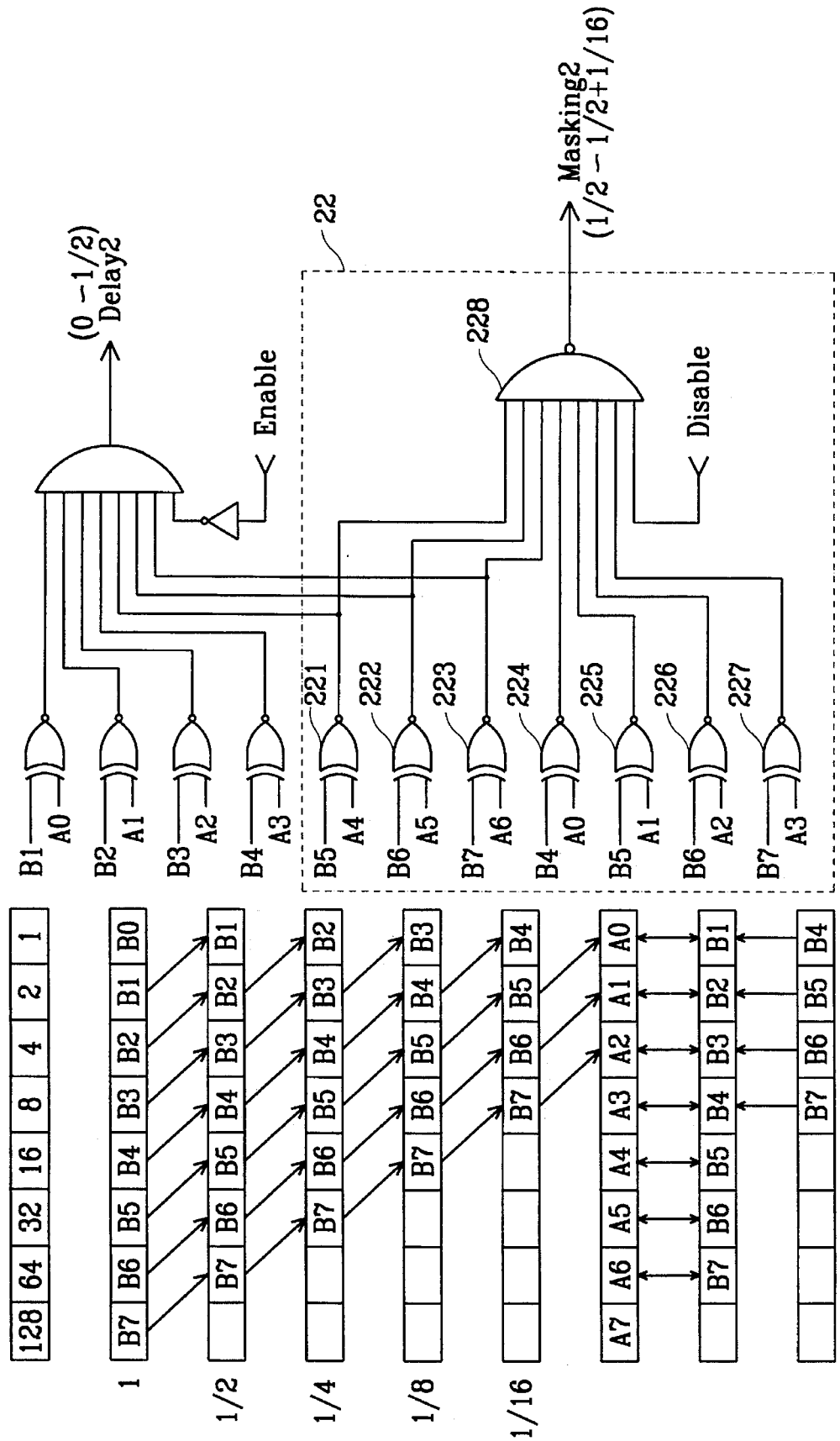
FIG. 17 is a circuit diagram of a center point detector and a digital masking timing generator according to a preferred embodiment of the invention in a case where a first counter follows a second counter.

The second digital masking timing generator 22 is illustrated in FIG. 17. In the circuit, EX-NOR gates 221 to 227 receive pairs of the first and second counters 70 and 80 bits B5 and A4, B6 and A5, B7 and A6, and B4 and A0, B5 and A1, B6 and A2, B7 and A3 as each input, in case the second counter 80 is a model reference, and outputs after performing an EX-NOR function. A multi-input NAND gate 228 receives outputs of each of the EX-NOR gates 221 to 227 and a disable signal, performs a NAND function, and generates and outputs a second masking signal (masking2).

Figure 18:
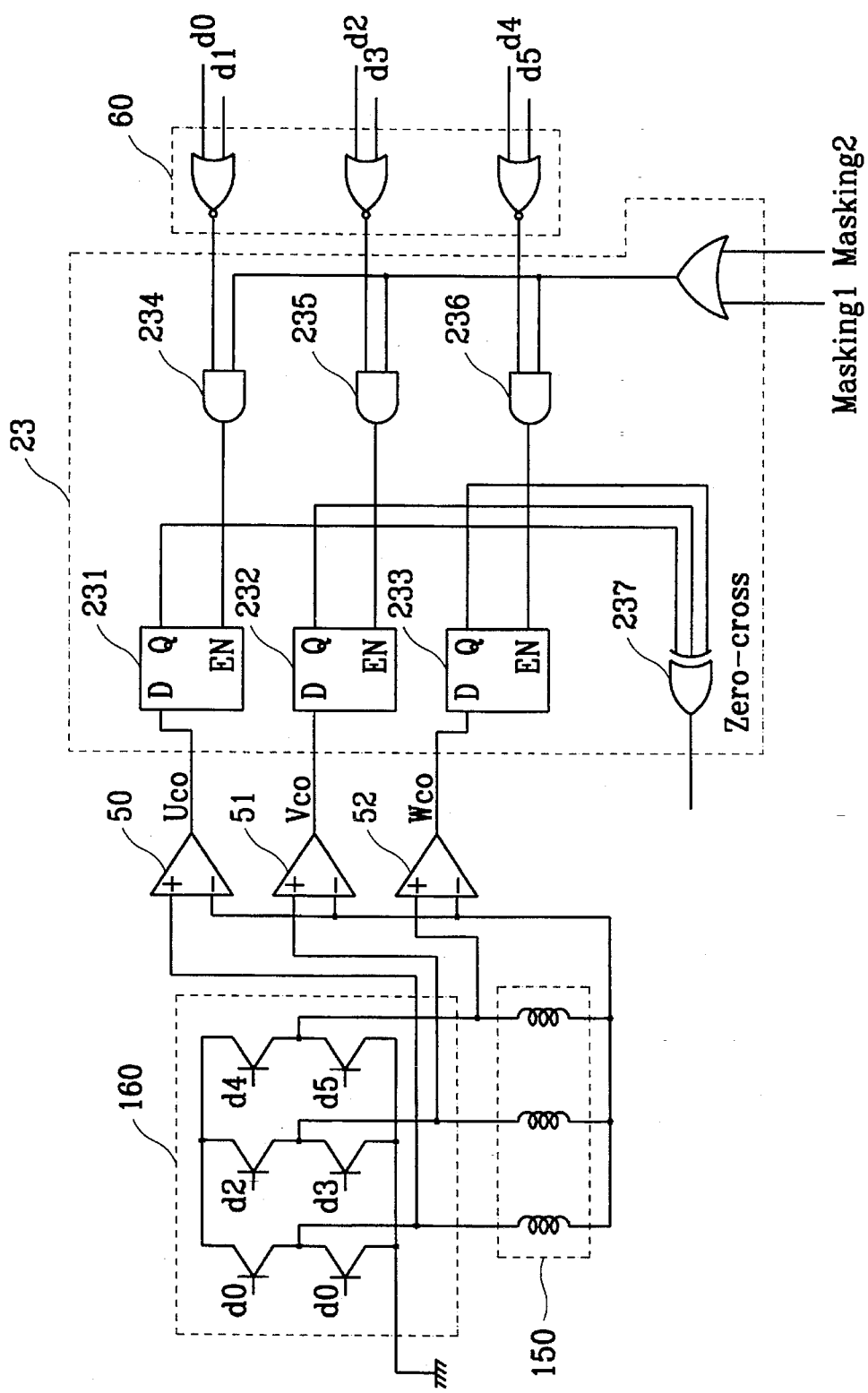
FIG. 18 is a circuit diagram of a digital masking executing circuit according to a preferred embodiment of the invention.

The digital masking executing circuit 23 is illustrated in FIG. 18. In the circuit, AND gates 234 to 236 receive the signal outputted from the phase selector 60 as each input, the first and the second masking signals (masking1 and masking2) outputted from the digital masking timing generators 21 and 22 are ORed together as a common input, and AND gates 234 to 236 output after performing an AND function. D-latch circuits 231 to 233 make each output of the AND gates 234 to 236 as an enable input EN, and each receive the outputs Uco, Vco, and Wco of each comparator 50 to 52 as input D, and mask according to the enabled input. An EX-OR gate 237 receives each output Q of the D-latch circuits 231 to 233, performs an EX-OR function, and generates and outputs a zero-cross signal.

Figure 21:
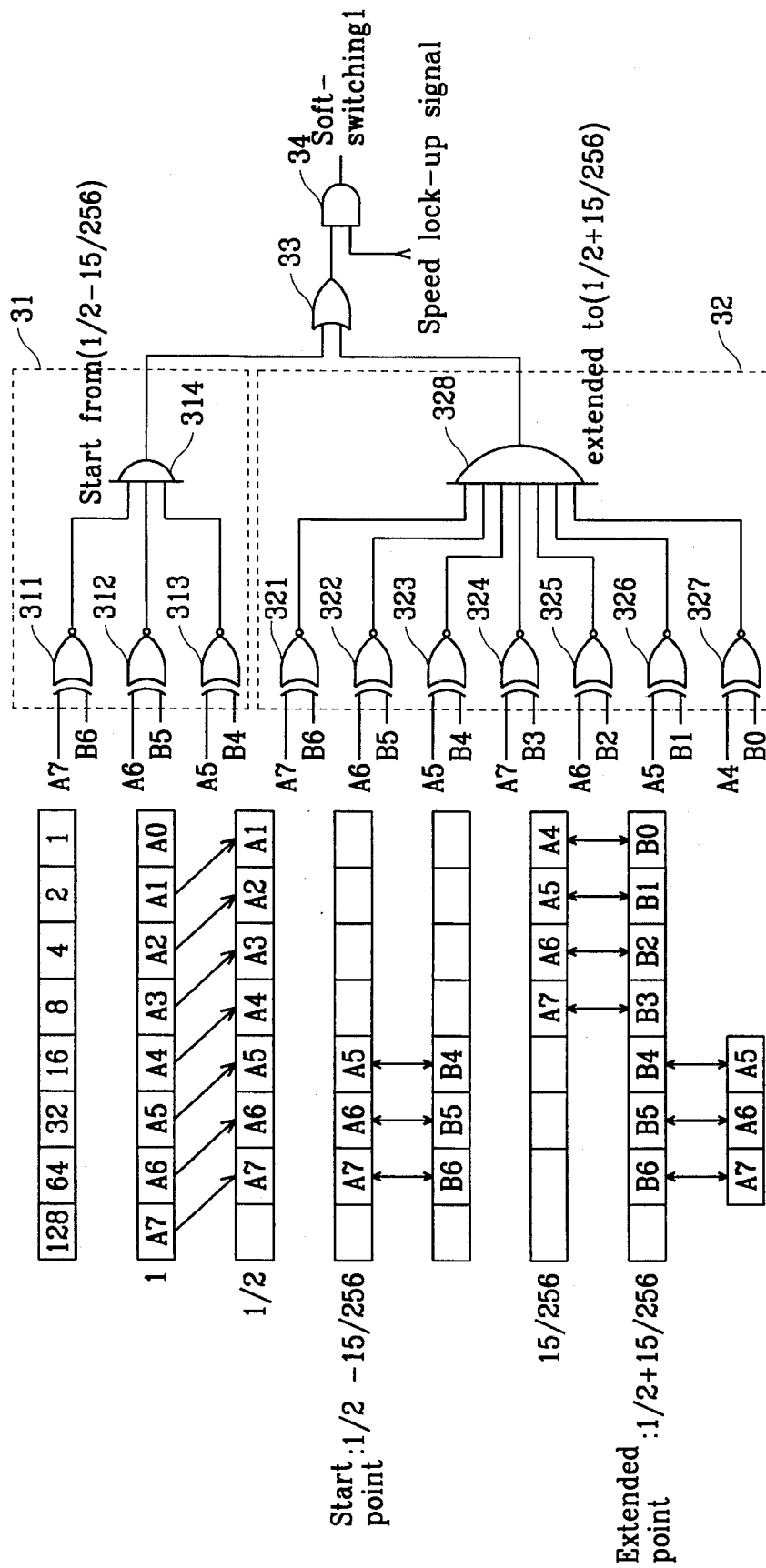
FIG. 21 is a circuit diagram of a digital soft switching circuit of a model reference following commutation circuit according to a preferred embodiment of the invention.

A digital soft switching circuit 30 of the model reference following commutation circuit according to the preferred embodiment of the present invention is illustrated in FIG. 21. In the circuit, a starting point detector 31 detects a commutation starting point located before a center point. An extended point detector 32 detects an extended point, which is an end point of commutation located after the center point. An OR gate 33 receives the output of the starting point detector 31 and the extended point detector 32, and outputs after performing an OR function. An AND gate 34 receives the output of the OR gate 33 and a speed lock-up signal, performs an AND function, and generates and outputs a soft switching signal.

The starting point detector 31 includes EX-NOR gates 311 to 313 which receive pairs of the first and the second counters 70 and 80 bits A7 and B6, A6 and B5, and A5 and B4 as two inputs, when the first counter 70 is a model reference, and outputs after performing an EX-NOR function. An AND gate 314 receives each output of the EX-NOR gates 311 to 313, performs an AND function, and outputs after generating a commutation starting signal.

The extended point detector 32 includes EX-NOR gates 321 to 327 which receive pairs of the first and the second counters 70 and 80 bits A7 and B6, A6 and B5, A5 and B4, and A7 and B3, A6 and B2, A5 and B1, A4 and B0, as two inputs when the first counter is a model reference, and outputs after performing an EX-NOR function. An AND gate 328 receives each output of the EX-NOR gates 321 to 327, performs an AND function, and outputs after generating a commutation extending signal.

The operation of a model reference following commutation circuit and an adjusting method thereof according to the preferred embodiment of the invention is described below.

First, an operation of a digital angular delaying circuit 10 of a model reference following commutation circuit according to the preferred embodiment of the invention will be described. The digital angular delaying circuit delays a predetermined digital angle to find an optimal commutation switching point, after detecting a zero-cross point. The angular delaying operation is proportional to the speed of the motor, and is performed in real-time by two counters. The digital angular delaying circuit ensures that a back-emf zero-cross point occurs 30° out of phase from an optimal switching point which is located midway through a commutation interval.

The circuit further provides a user with flexibility for selecting a delay angle according to the particular motor applied to the circuit. In addition, the circuit enables fine tuning of the angular delay, thereby eliminating the need for external components such as a delaying circuit for providing a fixed time-constant determined by a resistor and capacitor, and for optimizing torque and noise reduction.

The two counters 70 and 80 illustrated in FIG. 3 play a prominent role in this circuit to help the model reference following digital angular delaying circuit 10 of the preferred embodiment perform effectively. The two 8-bit counters shown are used as an example to describe the ideas introduced in the invention. However, in real applications, a level counter having more than 8 bits may be used according to an individual applicable circuit. Additionally, a latching circuit and a counter may be constructed instead of the two counters. This structure differs from the conventional circuits in the functions of stopping the counting, loading the counting results of the latching circuit, resetting the counter and restarting.

The center point detectors 11 and 12 illustrated in FIGS. 4 and 5 are logical circuits in which a midpoint of the commutation interval can be found automatically, as performed by EX-NOR gates 1 to 7, and 1-1 to 1-7. When a center point is detected by center point detectors 11 and 12, the commutation timing generator 13 generates a timing signal for setting the next commutation switching point. As illustrated in FIG. 6, the commutation signal generator 13 is performed by a D-Flip-Flop having an internal clock such as the one used in the two counters 70 and 80.

Figure 7:
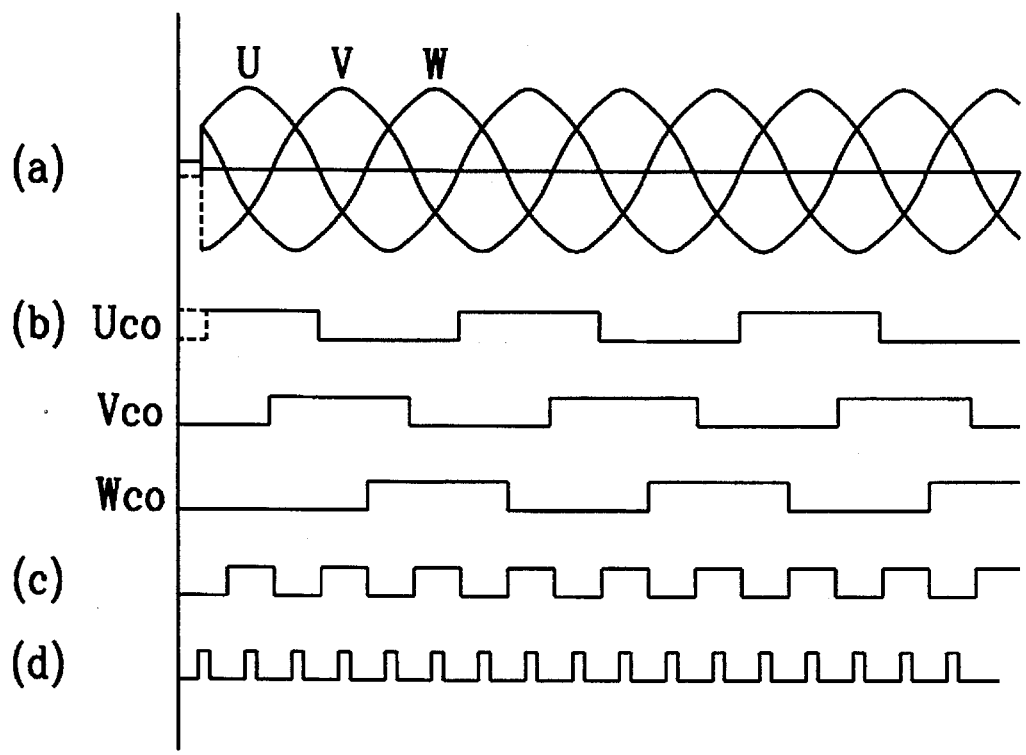
FIGS. 7(a) to 7(d) are timing diagrams showing the timing of signals in the digital angular delaying circuit illustrated in FIG. 3.

FIG. 7(a) shows a waveform of a back-emf generated from a motor coil, (b) shows a waveform of the back-emf compare signals outputted from each comparator 50, 51, and 52, (c) shows a waveform of a zero-cross signal generated for counting from a rising edge and a falling edge of the back-emf by the first and the second counters 70 and 80, and (d) shows a waveform of a commutation delaying signal outputted from the digital angular delaying circuit 10.

Figure 13:
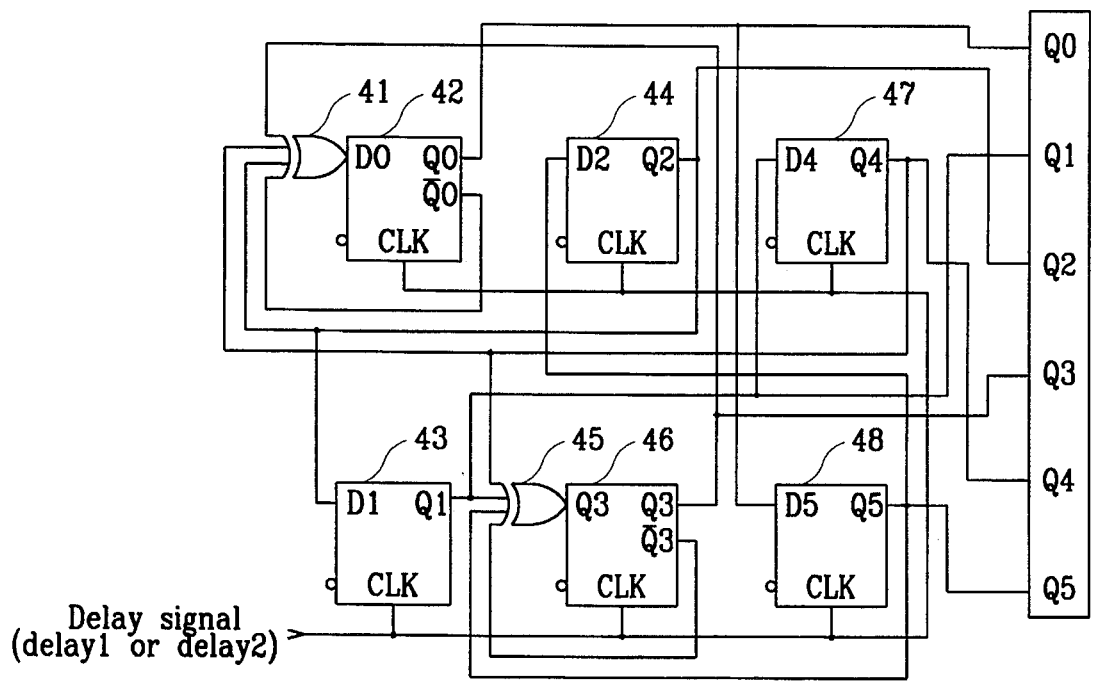
FIG. 13 is a circuit diagram of a commutation signal generator according to a preferred embodiment of the invention.
Figure 14:
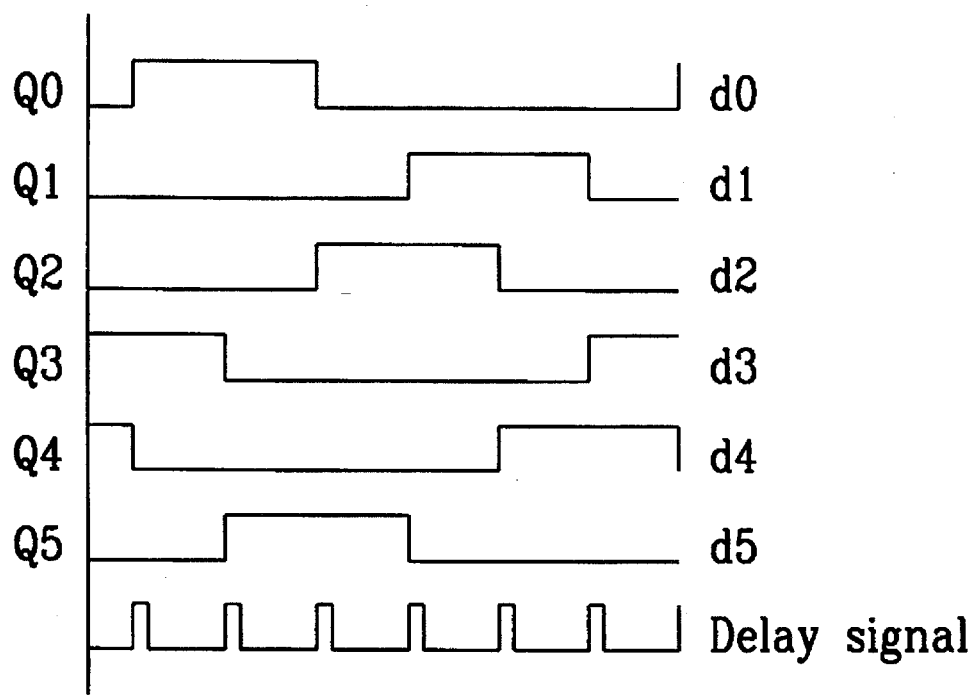
FIG. 14 is a waveform diagram of the output of the commutation signal generator illustrated in FIG. 13.

As illustrated in FIG. 13, the commutation signal generator 40 has six D-Flip-Flops 42, 43, 44, 46, 47 and 48, and generates commutation sequence signals D0 to D5 assembled with six states for driving a motor output stage 160. FIG. 14 is a waveform of the six-state commutation signals supplied to the motor driving output stage 160 through the commutation signal generator 40.

In FIGS. 10 and 11, respectively depicting the first counter clock controlling circuit 90 and the second counter clock controlling circuit 100 according to the preferred embodiment of the invention, the first and the second counter clock controlling circuits 90 and 100 supply a clock signal to a counter, as long as the first and the second counters 70 and 80 are not saturated, as indicated by an output signal (/A flow and/B flow) of the first and second overflow protection circuits 120 and 130.

In addition, according to a zero-cross input to RS-Flip-Flops 91 and 101 in each counter clock controlling circuit 90 and 100, the second counter 80 normally starts counting at a rising edge of the zero-cross, and stops counting at a falling edge of the zero-cross. In other words, these two counters work alternatively, the first counter 70 counts from the falling edge of the zero-cross while the second counter 80 rests. The counting results of the second counter 80 are stored, and may be considered as a model reference for setting a delaying angle for the next commutation. After the second counter 80 stops counting, the first counter 70 will count the remaining half cycle of the next zero-cross strain continuously, and follow a model reference for finding a center point through the counting results stored for the second counter 80.

Hereinafter, the center point detectors 11 and 12 in the digital angular delaying circuit 10, which play an important role by generating a delaying signal for setting a commutation point, are described.

With reference to FIG. 4, and assuming that the first counter 70 counts from a falling edge of the zero-cross, from a rising edge of the zero-cross, the second counter 80 follows the first counter 70 by counting according to the stored results of the first counter 70 serving as a model. While the second counter 80 counts, by shifting the bit order of the results of the second counter 80 by one-bit from the right side to the left side (dividing by half), the pairs of the counter bits A1 and B0, A2 and B1, A3 and B2 to A7 and B6 are inputted to EX-NOR gates 1 to 7, and, therefore, the EX-NOR gates 1 to 7 output a high-state signal whenever logical inputs of the same type are inputted therewith.

After the above shift and compare operations, the outputs from all of the EX-NOR gates 1 to 7 are inputted to the multi-input AND gate 8, so that when an output signal produced from the AND gate 8 attains a high-level, half of the stored count result from the first counter 70 have been counted by the second counter 80. In other words, the second counter has detected a center point between zero-cross points, which may be used to control a commutation interval.

The counting result of the second counter is considered correct for the previous commutation interval, and is equal to half of the count stored for the first counter 70. Once the midpoint of the previous commutation interval is taken, it is easy to determine the next commutation switching point. After finding the center point of the commutation interval, a model reference is not needed any more. Accordingly, the first counter 70 is reset until it is operated again. The reset execution is related to the masking time, and is not carried out until the masking time is over.

When an overflow is generated in the counter because of a long commutation interval, to prepare for a case when the correct center point cannot be found, an inverse speed lock-up signal to increase the speed of the motor is inputted to the multi-input AND gate 8.

In the same manner as described above, and as illustrated in FIG. 5, when the first counter 70 follows the second counter 80, and continues counting until another rising edge of the zero-cross signal, the first counter 70 finds a center point based on the counting results stored in the second counter 80, after which the second counter 80 can be reset. Upon a rising edge of the zero-cross signal, the first counter 70 stops counting and the second counter 80 is operated to count again. Accordingly, each counter always counts up.

Alternatively, the functions of the center point detectors 11 and 12 can be performed by a microcomputer according to a software program.

Once they have detected a center point, the center point detectors 11 and 12 generate a signal (delay1, delay2). This signal is sent to the commutation timing generator 13 shown in FIG. 6. The signal produced from the commutation timing generator 13 is then sent to the commutation signal generator 40, having the six D-Flip-Flops shown in FIG. 13. Furthermore, a certain angular delaying operation may be possible by comparing bit-to-bit the results of the first counter 70 with the results of the second counter 80, through an external pin of the motor driving IC circuit.

Next, one problem to consider in driving a motor is that long commutation intervals during low rotation speeds may cause a counter overflow. Therefore, an overflow protection circuit is required. An overflow protection circuit according to the preferred embodiment of the invention is described below with the reference to FIGS. 8 and 9.

Before the counter can possibly reach saturation, the overflow protection circuits 120 and 130 will immediately stop counting and save the counting results by generating a counter saturation adjust signal "Satcon". The signal "Satcon" indicates that one count value remains before the counter overflows. Therefore, the counters 70 and 80 will never fail although digital overflow has actually happened. Overflow protection circuits 120 and 130 save the counted data from the counters. The next counting counter will take this data as its model reference and follow therefrom.

Overflow protection circuits 120 and 130 also sense motor acceleration. That is, during long commutation intervals or during a start up period, the object of commutation is to spin up the motor to a desired speed as fast as possible. At this time, finding a center point which is away from the zero-cross point by an ideal 30 degrees may be less important than accelerating the motor. The commutation delay angle can be chosen anywhere from 3° to 30° according to the dynamic range of the counter.

Furthermore, when an overflow occurs and the "Satcon" signal is generated, the next counter will take this "one-step before overflow" data for the model reference, and will count by following this data. Simultaneously, the counter clock modulating circuit 110 will be enabled to overcome the overflow.

As illustrated in FIG. 12, the counter clock modulating circuit according to the preferred embodiment of the invention includes a 3-bit shift counter 115 in which a counting time is increased by 2, 4, and 8 times a normal case by dividing the counter clock by ½, ¼, and ⅛, respectively. The shift counter 115 has three selectors 115-1 to 115-3. When the counting time is increased, the counting resolution is decreased proportionally, and a long commutation interval results. Counting accuracy is meaningless for commutation. As the motor speed is increased, the commutation interval will naturally be shorter than the modulated dynamic range of the counters. When the counter can be operated without saturation, the counting clock is set back to the normal frequency.

A digital masking circuit of a model reference following commutation circuit according to the preferred embodiment of the invention is described below with the reference to FIGS. 15, 16 and 17.

The digital masking timing generator 21 outputs a signal after determining a masking time as a certain percentage of the commutation interval from the detected center point. Thus, the determined masking time can be taken by shifting a certain bit of the counter from left to right. That is, a masking time of $½^m$ percentage of the commutation interval can be easily taken by only shifting the bits of the model reference counter by m bits from left to right.

For instance, as illustrated in FIG. 16, to mask for 1/16 of a commutation interval from the center point, once the center point is detected, and a delay signal is generated through the digital angular delaying circuit 10, then one may take the four most significant digits from the model reference counter such as A7, A6, A5, and A4 by shifting from left to right. Then an EX-NOR function is performed with the most significant 4 digits of the model reference counter (the first counter) and the least significant 4 digits of the model following counter (the second counter), that is, with A7 and B3, A6 and B2, A5 and B1, and A4 and B0. The output of the EX-NOR function performed between the three bits B6, B5, B4 of the second counter 80, and the three bits A5, A6 and A7 of the model reference counter 70, and all the other outputs from above are input to the multi-input NAND gate 218 with the disable signal, so that a masking time from ½ to ½+1/16 of the commutation interval is achieved.

FIG. 17 shows the digital masking timing generator 22. The explanation is the same as given above except that second counter 80 is used as the model reference counter and the first counter 70 is used as the model following counter.

Moreover, the explanation above is given as an example. The digital masking circuit of the model reference following commutation circuit according to the preferred embodiment of the invention allows a user to select masking times which are optimal for each individual application. In many cases, the masking is optimally enabled shortly before the commutation takes place. And as illustrated above, selecting the masking time can be easily achieved by selecting different combinations of digital bits of the first counter and the second counter.

As shown in FIG. 15, a digital masking executing circuit 23 inputs the signals (masking1, masking2) outputted from the masking timing generators 21 and 22, and performs an actual masking. The digital masking executing circuit 23 will be described hereinbelow with reference to FIGS. 18, 19, and 20.

As illustrated in FIG. 18, the ORed masking signals (masking1, masking2) are commonly inputted to the AND gates 234 to 236 with the signals outputted from the phase selector 60. Therefore, during masking, as controlled by the digital masking signal, the enable input EN of the D-latch circuits 231 to 233 is set to the low-level signal. Accordingly, regardless of the input to the D-latch circuits 231 to 233, the D-latch circuits 231 to 233 keep the output Q as previous state Q0 because the EN input is set at a low-level. In other words, a spurious zero-cross caused by a switching noise, for example, is latched and removed from the back-emf zero-cross.

Figures 19, 20:
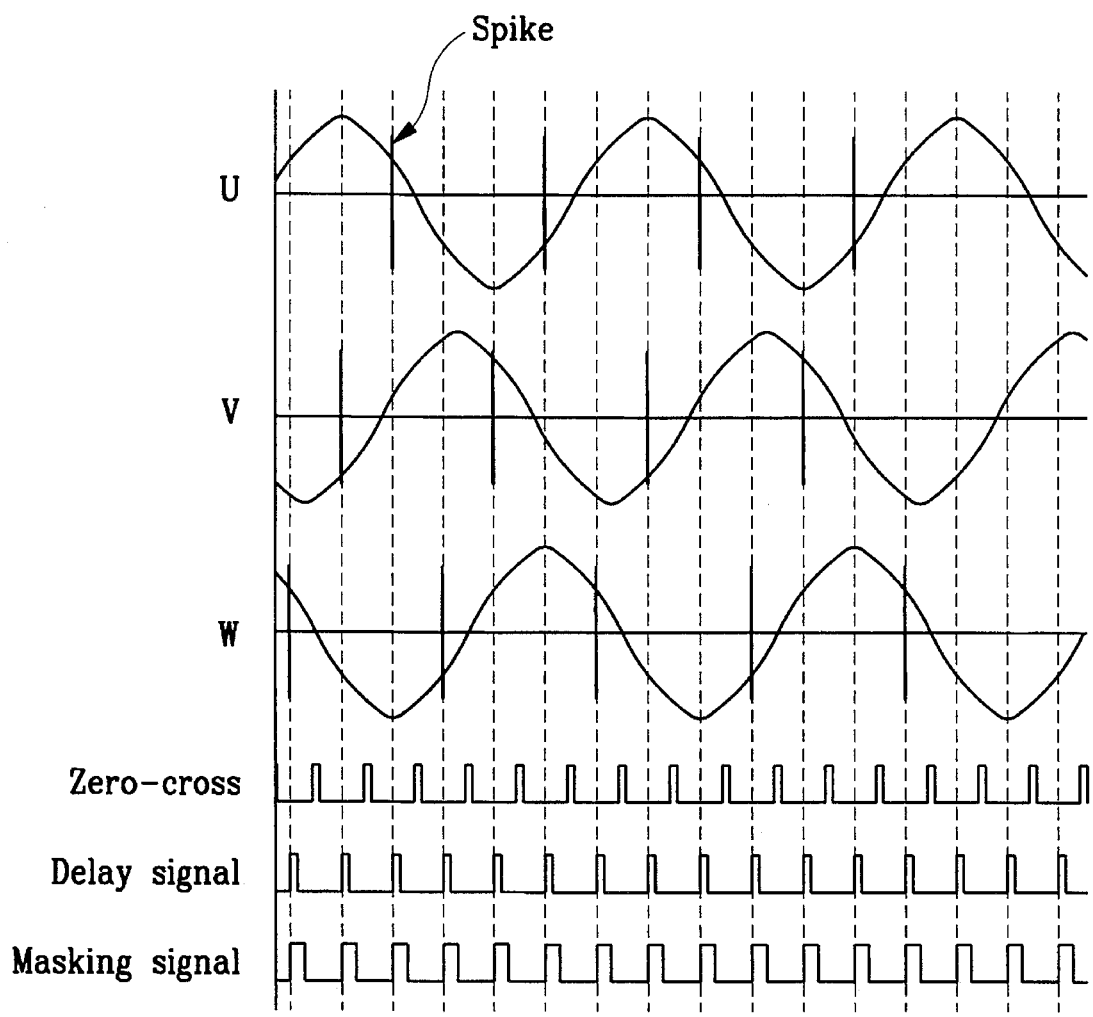
FIG. 19 is a truth table showing a relation of inputs and outputs of a D-latch circuit of the digital masking executing circuit illustrated in FIG. 18.
FIG. 20 is a timing diagram of the signals in the digital masking executing circuit illustrated in FIG. 18.

After latching, the output from the D-latch circuits 231 to 233 is solved from the latching state. Accordingly, as the EN input becomes a high state, inputs of the D-latch circuits 231 to 233 are changed, and consequently the outputs are changed according to the inputs. And each output Q of the D-latch circuits 231 to 233 are supplied to an EX-NOR gate, and the result is supplied as the zero-cross outputs. The operating condition of the D-latch circuit is shown in FIG. 19.

As described above, illustrated in FIG. 20 are waveforms of the zero-cross of the back-emf outputted from the digital masking executing circuit 23, the delaying signal generated by the center point detectors 11 and 12 after detecting the rising and falling edges of the zero-cross, and the masking signal generated after the delaying signal.

The digital masking circuit 20 and the digital angular delaying circuit 10 share the same counting result of the two counters 70 and 80. Thus, these two have the same inherent characteristics of the counters.

Figure 1A:
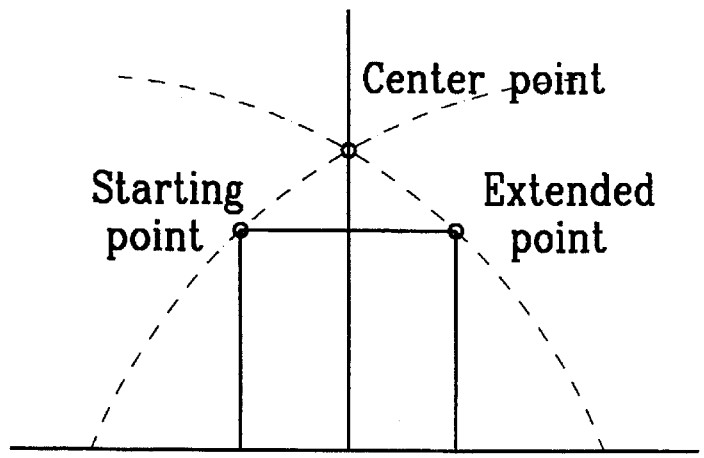
FIG. 1A illustrates a commutation interval which is symmetrical with respect to a center reference axis.
Figure 1B:
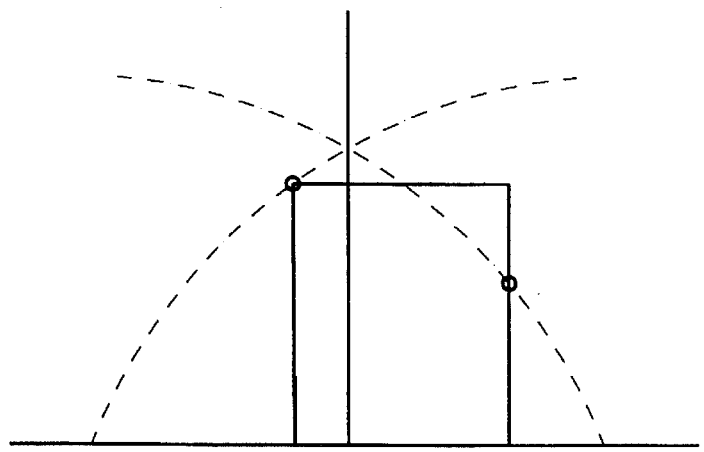
FIG. 1B illustrates a commutation interval which is symmetrical with respect to a center reference axis.

As illustrated in FIG. 21, the soft switching circuit 30 of the model reference following commutation circuit according to the preferred embodiment of the invention includes a starting point detector 31 for detecting a commutation starting point disposed before a center point, and an extended point detector 32 for detecting a commutation ending point located after a center point, and is therefore capable of soft switching by switching from detected starting point to an extended point continuously. However, it is important that the starting point and the extended point of the commutation should be perfectly symmetrical in their length with respect to the center point, as illustrated in FIG. 1A, and not asymmetrical as shown in FIG. 1B.

The operation of the soft switching circuit of the model reference following commutation circuit according to the preferred embodiment of the invention will be described in detail hereinbelow with reference to FIGS. 21 and 22.

For example, suppose a soft switching is to be performed from a starting point of $15/256$ ($1/2 - 15/256$) of the commutation interval disposed before a center point, to an extended point of $15/256$ ($1/2 + 15/256$) of the commutation interval located after a center point. In this case, as in the above mentioned description, one first gets $1/2$ of the commutation interval time by shifting one bit from left to right of the model reference counter 70. Then, the bits except for the last four digits of the shifted counter bits, are paired with model following counter 80 bits, that is, A7 and B6, A6 and B5, and A5 and B4, as inputs to EX-NOR gates 311 to 313. From these results, a starting point signal of soft switching ($1/2 - 15/256$) of the commutation interval time is obtained. Next, by shifting right the four digits A7 to A4 as the least significant bits of the model reference counter 70, one can obtain the switching time which is extended from the center point. Finally, by performing an EX-NOR function between the shifted bits of the model reference counter 70 and the bits of the model following counter 80, that is, A7 and B3, A6 and B2, A5 and B1, and A4 and B0, and performing an EX-NOR gate with the remaining bits of the model following counter, B6 and A7, B5 and A6, and B4 and A5, one can obtain an extended point signal of $1/2 + 15/256$ of the commutation interval.

The starting point and the extended point can be modulated depending upon an individual application. In particular, it can be changed according to the selection of a user, and the variation can be made simply by adjusting a shifting of the model reference counter bits. In the same manner as above, when the first counter 70 is a model following counter, and when the second counter 80 is a model reference, the variation can be made by shifting right the bits of the second counter 80, so that the ratio of di/dt can be reduced, the current re-circulation back to power line caused by a spike can be avoided, and a snubber circuit can be eliminated.

Figure 22:
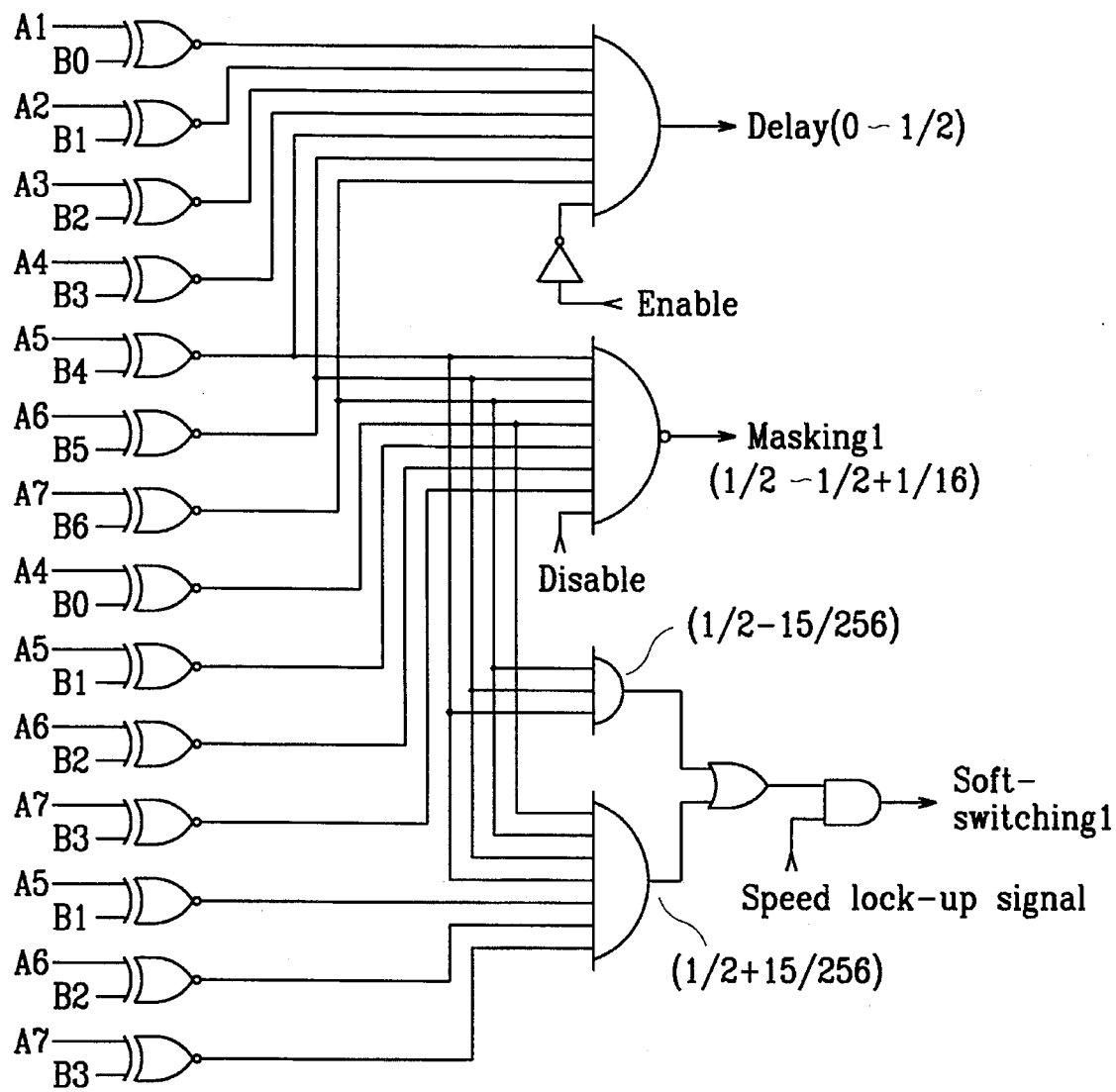
FIG. 22 is a detailed circuit diagram of a center point detector, digital masking timing generator, and a digital soft switching circuit according to a preferred embodiment of the invention in a case where a second counter follows a first counter.
Figure 23:
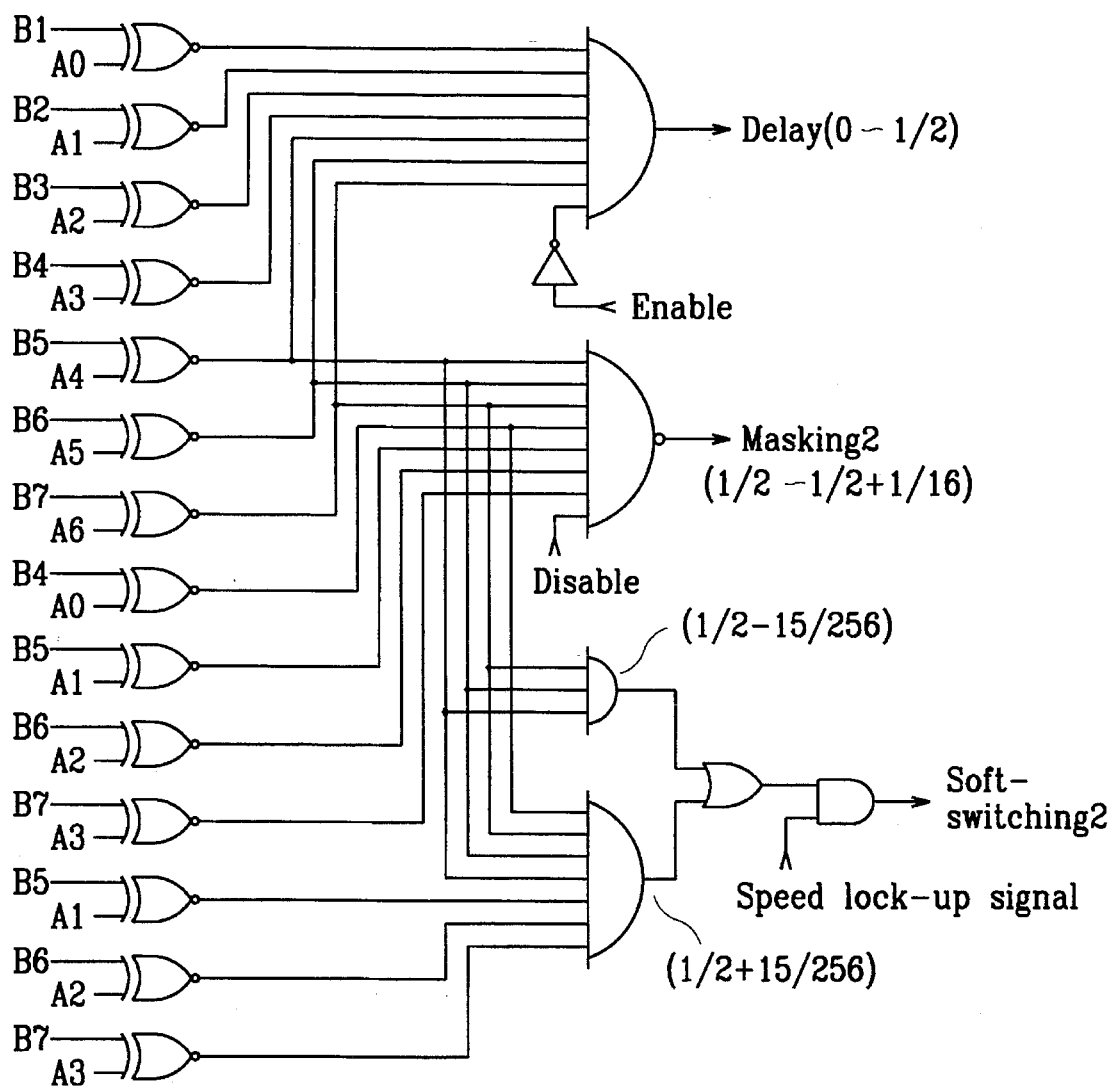
FIG. 23 is a detailed circuit diagram of a center point detector, digital masking timing generator, and a digital soft switching circuit according to a preferred embodiment of the invention in a case where a first counter follows a second counter.

The above-mentioned model reference following digital angular delaying circuit, digital masking circuit and digital soft switching circuit can be embodied a single circuit as illustrated in FIGS. 22 and 23, wherein FIG. 22 shows the case where the first counter is a model reference and FIG. 23 shows the case where the second counter is a model reference. Since the components of these circuits have been already described individually, no further explanation will be given.

Figure 24:
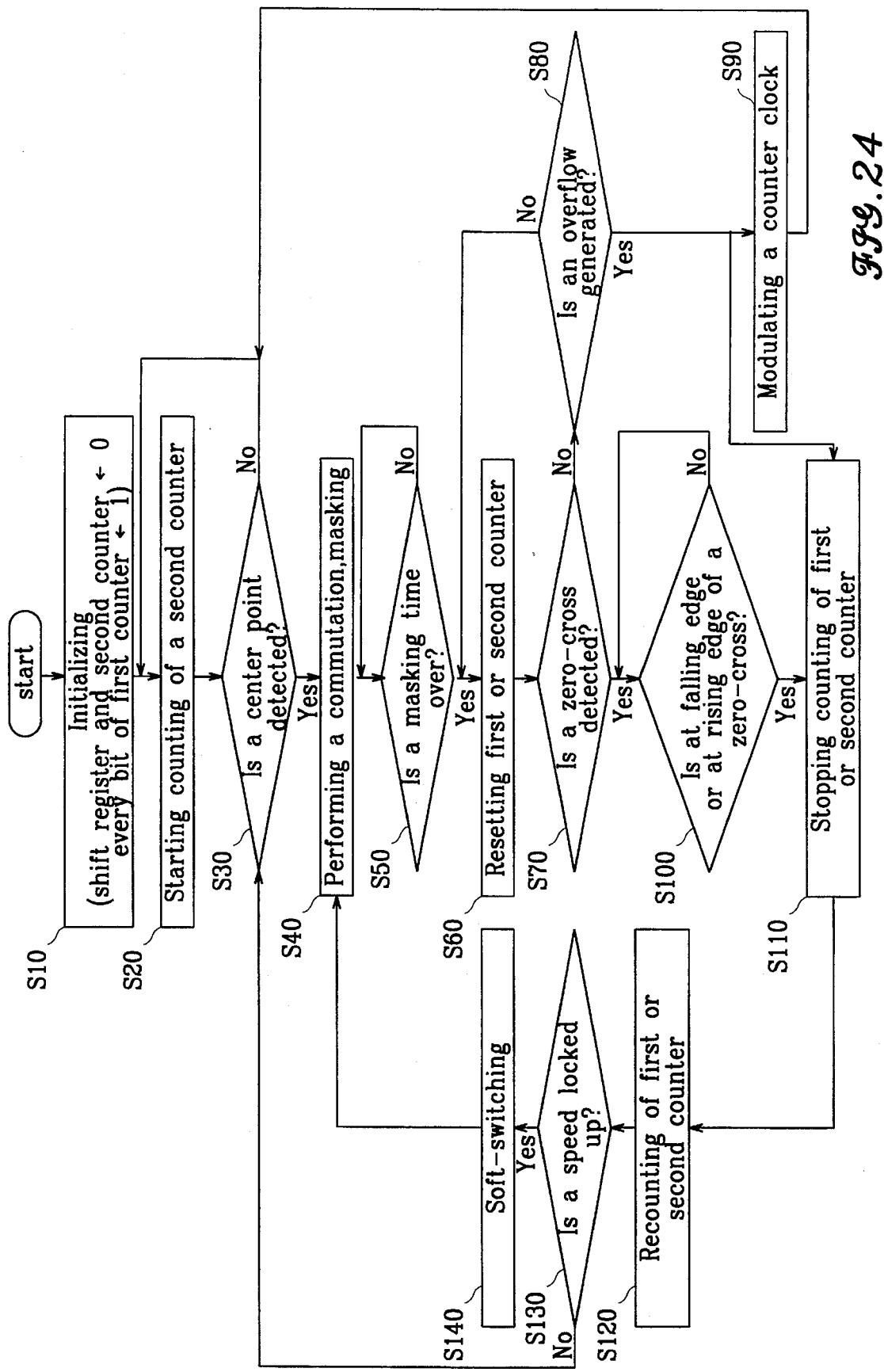
FIG. 24 is a flowchart showing a method to adjust a commutation control in a model reference following commutation circuit such as that illustrated in FIG. 2.

Finally, an adjusting method of the model reference following commutation circuit according to the preferred embodiment of the invention is described below with reference to the flowchart in FIG. 24.

In step S10, each shift register and the second counter 80 used in the model reference following commutation circuit is initialized and cleared, and every bit of the first counter 70, model reference counter, is set to logic 1. In step S20, counting of the second counter 80 is started by turning on the counter clock.

At step S30, counting is continued, if a center point is not yet detected, after determining whether a center point is detected by the second counter 80. In step S40, if a center point is detected by the second counter 80, commutation and masking is performed.

At step S50, if it is determined that a masking time is not elapsed, masking is continued, and if the masking has elapsed, the first and the second counters are reset in step S60.

At step S70, it is determined whether a new zero-cross is detected. In step S80, control is returned to the determining step if a zero-cross is detected and an overflow is not generated. In step S90, if an overflow occurs, a counter clock is modulated and control is returned to the step of determining whether a center point is detected.

In step S100, in case that a zero-cross is detected, it is determined whether it is either at a rising edge or at a falling edge, and then determining continuously when it is neither at rising edge nor at falling edge. At step S110, if the zero-cross is either at rising edge or at falling edge, counting of the first and the second counters 70 and 80 is stopped. At step S120, counting of the first counter 70 is started if the second counter 80 stops counting, and vice versa.

In step S130, it is determined whether a speed is locked up. If a speed is locked up, control is returned to the step of determining whether a center point is detected. Otherwise, control is returned to the step of performing a commutation and a masking after performing a soft switching (step S140).

Accordingly, the present invention provides a model reference following commutation circuit and an adjusting method thereof, which generate an optimal real-time commutation delay time in the manner of on-line in adjusting a commutation circuit for driving a spindle motor, to mask a spurious zero-cross point which is incorrectly detected due to a noise after phase commutation, with two counters incorporated with each digital angular delaying circuit, and to make a soft switching by properly adjusting a turn on/off time of the motor driving output stage.

And this invention gives users flexibility to select the delaying angle to optimize torque and reduce a noise according to their individual, particular applications by avoiding using an external component as a fixed RC-time-delaying circuit for a resistance and a capacitor.

Although the present invention has been described in detail above with reference to the preferred embodiments thereof, those skilled in the art will readily appreciate that various modifications and substitutions can be made thereto without departing from the spirit and scope of the invention as set forth in the appended claims.

What is claimed is:

1. A circuit for controlling commutation in an electric motor, comprising:
   first and second counters which count time elapsed during intervals between zero crossings of back-emf detected during rotation of said electric motor, said first counter acting as a model reference counter and said second counter acting as a model following counter during odd ones of said intervals, said second counter acting as said model reference counter and said first counter acting as said model following counter during even ones of said intervals;

first and second detectors which detect center points of said odd and even intervals, respectively, when said model following counter counts up to half of a result stored in said model reference counter, said first and second detectors respectively outputting first and second delaying signals when said center points have been detected;

a commutation timing generator which receives said first and second delaying signals, and which generates and outputs a commutation timing signal based thereon; and a commutation signal generator which receives said timing signal from said commutation timing generator and generates a commutation sequence to control commutation in said electric motor according to said commutation timing signal.

2. The circuit as defined in claim 1, wherein said first and second counters are comprised of n bits and wherein said first and second detectors each include:

(n−1) logic gates which respectively receive corresponding pairs of the least significant (n−1) bits of said model following counter and the most significant (n−1) bits of said model reference counter and which output a logic result indicating when said model following counter counts a half of said result stored in said model reference counter; and a delaying signal generator which receives said logic result from said logic gates and an enable signal indicating that a rotation speed of said electric motor is locked up, and outputs one of said first and second delaying signals based thereon.

3. The circuit as defined in claim 1, wherein said commutation timing generator includes a flip-flop which receives said first and second delaying signals from said first and second detectors and an internal clock signal, and which generates said commutation timing signal synchronized with said internal clock signal.

4. The circuit as defined in claim 3, wherein said first and second counters count said time elapsed between said intervals based on said internal clock signal.

5. The circuit as defined in claim 2, wherein said logic gates are EX-NOR gates.

6. The circuit as defined in claim 5, wherein said delaying signal generator comprises a multi-input AND gate.

7. The circuit as defined in claim 1, wherein said first and second detectors are comprised of a microprocessor.

8. A circuit for controlling commutation in an electric motor, comprising:

first and second counters which count time elapsed during intervals between rising and falling edges of a zero cross signal, said zero cross signal indicating zero crossings of back-emf detected during rotation of said electric motor, said first counter acting as a model reference counter and said second counter acting as a model following counter during odd ones of said intervals, said second counter acting as said model reference counter and said first counter acting as said model following counter during even ones of said intervals;

a commutation signal generator which receives a timing signal indicating when said model following counter counts up to a fraction of a result stored in said model reference counter, and which generates a commutation sequence to control commutation in said electric motor according to said timing signal;

a comparator which compares said detected back-emf to a common voltage to detect said zero crossings of said detected back-emf;

a phase selector which monitors said commutation sequence output by said commutation signal generator and detects a phase of said electric motor;

first and second masking timing generators which are operative during said odd and even intervals, respectively, said digital masking timing generators generating masking timing signals based on said first and second counters, said masking timing signals indicating portions of said intervals in which to mask zero crossings detected by said comparator;

a digital masking executing circuit which receives said masking timing signals, said phase detected by said phase selector, and said detected zero crossings from said comparator, and outputs a zero cross signal having said rising and falling edges based thereon.

9. A circuit as defined in claim 8, wherein said first and second counters are comprised of n bits and wherein said first and second masking timing generators each include:

a plurality of logic gates which respectively receive corresponding pairs of bits from said first and second counters, a logic result of said logic gates indicating said portions of said intervals for masking said detected zero crossings, said portions extending from ½ of said intervals to $½+½^m$ of said intervals, where m is between 1 and n; and a masking signal generator which receives said logic result and a disable signal, and generates a corresponding one of said masking timing signals.

10. A circuit as defined in claim 8, wherein said digital masking executing circuit includes:

a masking controlling signal generator which receives said phase detected by said phase selector and said masking signals and which outputs a masking controlling signal which controls masking of said zero crossings for said detected phase;

a masking controller which receives said masking controlling signal and said detected zero crossings from said comparator, and enables output of said detected zero crossings according to said masking controlling signal; and a zero-cross signal generator which receives said enabled detected zero crossings and outputs said zero-cross signal.

11. A circuit as defined in claim 9, wherein said portions of said intervals for masking said detected zero crossings is adjusted by changing said logic gates and said corresponding pairs of bits input thereto.

12. A circuit as defined in claim 9, wherein said logic gates are comprised of EX-NOR gates.

13. A circuit as defined in claim 12, wherein said masking signal generator comprises a multi-input NAND gate.

14. A circuit as defined in claim 10, wherein masking controlling signal generator comprises an AND gate.

15. A circuit as defined in claim 10, wherein masking controller comprises a plurality of D-flip-flops.

16. A circuit as defined in claim 10, wherein said zero-cross signal generator comprises an EX-OR gate.

17. A soft-switching circuit for controlling commutation of an electric motor, comprising:

first and second counters which count time elapsed during intervals between zero crossings of back-emf detected during rotation of said electric motor, said first counter acting as a model reference counter and said second counter acting as a model following counter during odd ones of said intervals, said second counter acting as said model reference counter and said first counter acting as said model following counter during even ones of said intervals;

a starting point detector which detects a commutation starting point within each of said intervals based on said first and second counters;

an extended point detector which detects a commutation ending point within each of said intervals based on said first and second counters, said commutation starting point and said commutation ending point being located symmetrically with respect to a center point of each of said intervals;

a controlling signal generator which receives the outputs of said starting point detector and said extended point detector, and outputs a signal indicating said commutation starting point and said commutation extended point; and a soft-switching signal generator which receives the signal output from said controlling signal generator and which receives an enable signal indicating whether an engine rotation speed is locked up signal, and outputs a soft switching signal based thereon.

18. A soft-switching circuit as defined in claim 17, wherein said first and second counters are comprised of n bits and wherein said starting point detector includes:

a plurality of first logic gates which respectively receive corresponding pairs of bits from said first and second counters, a logic result of said first logic gates indicating that said commutation starting point is detected, said commutation starting point being located at an interval fraction of $k/2^m$ before said center point of each of said intervals, where m is between 2 and n and where $k<2^m$; and a starting point signal generator which receives said logic result and generates a starting point signal.

19. A soft-switching circuit as defined in claim 18, wherein said extended point detector includes:

a plurality of second logic gates which respectively receive corresponding pairs of bits from said first and second counters, a logic result of said logic gates indicating that said commutation ending point is detected, said commutation ending point being located at said interval fraction of $k/2^m$ after said center point of each of said intervals, where m is between 2 and n and where $k<2^m$; and an ending point signal generator which receives said logic result and generates an ending point signal.

20. A soft-switching circuit as defined in claim 17, wherein said controlling signal generator comprises an OR gate.

21. A soft-switching circuit as defined in claim 18, wherein said soft-switching signal generator comprises an AND gate.

22. A soft-switching circuit as defined in claim 20, wherein said first and second logic gates are EX-NOR gates.

23. A soft-switching circuit as defined in claim 20, wherein said starting point signal generator and said ending point signal generator are comprised of an AND gate.

24. A circuit for controlling commutation of an electric motor, comprising:

first and second counters which count time elapsed during intervals between rising and falling edges of a zero cross signal according to an internal clock, said zero cross signal indicating zero crossings of back-emf detected during rotation of said electric motor, said first counter acting as a model reference counter and said second counter acting as a model following counter during odd ones of said intervals, said second counter acting as said model reference counter and said first counter acting as said model following counter during even ones of said intervals;

an angular delay circuit which detects an optimal switching point within each of said intervals based on said first and second counters;

a commutation signal generator which receives a timing signal indicating said optimal switching point detected by said angular delay circuit, and which generates a commutation sequence to control commutation in said electric motor according to said timing signal;

a comparator which compares said detected back-emf to a common voltage to detect said zero crossings of said detected back-emf;

a phase selector which monitors said commutation sequence output by said commutation signal generator and detects a phase of said electric motor;

a masking circuit which detects portions of each of said intervals in which to mask zero crossings detected by said comparator based on said first and second counters, and which receives said phase detected by said phase selector, and said detected zero crossings from said comparator, and outputs a zero cross signal having said rising and falling edges based thereon;

a soft-switching circuit which controls the turn on/off time of a switching device according to a commutation starting point and a commutation ending point within each of said intervals, said commutation starting and ending points being based on said first and second counters and being located symmetrically with respect to a center point of each of said intervals;

a counter clock controlling circuit which causes said first and the second counters to be operated alternately at said rising and falling edges of said zero cross signal from said masking circuit;

first and second overflow protection circuits which protect said first and second counters from overflow; and a counter clock modulating circuit which reduces a frequency of said internal clock by dividing said internal clock by $\frac{1}{2}^m$ through a m-bit shift counter.

25. A circuit as defined in claim 24, wherein said first overflow protection circuit includes:

a first overflow detector which compares said first counter with a full counter value and outputs a first result; and a first overflow protecting signal generator which receives said first result of said first overflow detector and outputs a first overflow protecting signal based thereon.

26. A model reference following commutation circuit as defined in claim 25, wherein said second overflow protection circuit comprises:

a second overflow detector which compares said second counter with said full counter value and outputs a second result; and a second overflow protecting signal generator which receives said second result of said second overflow detector and outputs a second overflow protecting signal based thereon.

27. A circuit as defined in claim 26, wherein said first and second overflow detectors are AND gates.

28. A circuit as defined in claim 26, wherein said first and second overflow protection signal generators are multi-input AND gates.

29. A circuit as defined in claim 24, wherein said counter clock controlling circuit includes:

a first gate which receives said zero cross signal and an inverse of said zero cross signal and which outputs a first gate driving signal of active-high level during an active-low section of said zero cross signal;

a second gate which receives said first gate driving signal and which receives said internal clock as a clock input to output a first synchronized gate driving signal;

a first enable signal generator which receives said zero cross signal and an output of said second overflow protection circuit, and which outputs a first enable signal when said zero cross signal is at an active-low level or when an overflow is not generated at the second counter;

a second enable signal generator which receives said first synchronized gate driving signal and said first enable signal, and outputs a second enable signal in said active-low level of said zero cross signal; and a first counter clock signal generator which receives said second enable signal, said internal clock and an inverse output of said first overflow protection circuit, and outputs a first clock signal as a clock input to said first counter.

30. A circuit as defined in claim 29, wherein said counter clock controlling circuit includes:

a third gate which receives said zero cross signal and an inverse of said zero cross signal and which outputs a third gate driving signal of active-high level during an active-high section of said zero cross signal;

a fourth gate which receives said third gate driving signal and which receives said internal clock as a clock input to output a second synchronized gate driving signal;

a third enable signal generator which receives an output of said first overflow protection circuit and said second synchronized gate driving signal, and which outputs a third enable signal when said zero cross signal is at said active-high level or when an overflow is generated at the first counter;

a second counter clock signal generator which receives said third enable signal, said internal clock and an inverse output of said second overflow protection circuit, and outputs a second clock signal as a clock input to said second counter.

31. A circuit as defined in claim 30, wherein said first and third gates are RS-flip-flops.

32. A circuit as defined in claim 30, wherein said second and fourth gates are D-flip-flops.

33. A circuit as defined in claim 30, wherein said first enable signal generator comprises a NAND gate.

34. A circuit as defined in claim 30, wherein said second enable signal generator comprises an AND gate.

35. A circuit as defined in claim 30, wherein said third enable signal generator comprises an OR gate.

36. A circuit as defined in claim 30, wherein said first and second clock signal generators are 3-input AND gates.

37. A circuit as defined in claim 24, wherein said counter clock modulator includes:

first and second overflow detectors which receive outputs of said first and second overflow protection circuits, and detect first and second overflows, respectively;

a first trigger signal generator which receives outputs of said first and second overflow detectors and an inverse signal thereof, and which outputs a trigger signal when either said first or second overflow is detected;

a second trigger signal generator which receives output of said first trigger signal generator and receives said internal clock as a clock input, and outputs a synchronized trigger signal;

a third trigger signal generator which receives said synchronized trigger signal and said internal clock and outputs a final trigger signal when said two inputted signals are at a high level;

a m-bit shift counter which receives said final trigger signal as a clock input and outputs after dividing said final trigger signal by $½, ¼$ to $½^m$;

a selector which receives said first and second overflows as a clock input, and which select an output terminal of said m-bit shift counter based thereon; and a modulated clock signal generator which receives output of said m-bit shift counter from said output terminal selected by said selector, and which outputs a modulated clock signal when an overflow is generated at said first or second counters.

38. The circuit as defined in claim 37, wherein said first and second overflow detectors are OR gates.

39. The circuit as defined in claim 37, wherein said m-bit shift counter comprises m-T-Flip-Flops which are serially connected in stages to receive outputs of previous stages as a clock input and to output after dividing.

40. The circuit as defined in claim 37, wherein said selector comprises a plurality of T-Flip-Flops which are serially connected in stages to receive output of previous stages as a clock input.

41. A circuit as defined in claim 24, wherein said first counter is an n-bit counter and said second counter is a latching circuit.

42. A circuit as defined in claim 24, wherein said soft-switching circuit controls said switching devices such that a ratio of di/dt in said electric motor is reduced and current re-circulation back to a power line is avoided.

43. A circuit as defined in claim 24, wherein said first and second overflow protection circuits prevent overflow caused by a long commutation interval, or a low rotating speed of said electric motor.

44. A circuit as defined in claim 24, wherein said electric motor is a three-phase motor and said commutation sequence has six states.

45. A method for controlling commutation of an electric motor, comprising the steps of:

detecting zero crossings of back-emf generated during rotation of said electric motor and generating a zero cross signal having first and second transition edges indicating said detected zero crossings;

setting a first counter as a model reference counter and a second counter as a model following counter upon a first transition edge of said zero cross signal;

setting said second counter as said model reference counter and said first counter as said model following counter upon a second transition edge of said zero cross signal;

incrementing said model following counter according to an internal clock;

comparing said model following counter to a stored count in said model reference counter to determine if an optimal switching point is detected;

performing commutation if said optimal switching point is detected;

resetting said model reference counter when said optimal switching point is detected; and continuing incrementing said model following counter until a new transition edge of said zero cross signal.

46. The method according to claim 45, further comprising the steps of:

masking detections of said zero crossings if said optimal switching point is detected until a masking time has elapsed;

delaying said resetting step until said masking time has elapsed.

47. The method according to claim 45, further comprising:

determining whether an overflow occurs in said model following counter before a new transition edge of said zero cross signal; and modulating said internal clock if said overflow occurs and returning to said setting step.

48. The method according to claim 45, wherein said step of determining whether said optimal switching point is detected includes determining if a count in said model following counter is one-half said count stored in said model reference counter.

49. The method according to claim 45, further comprising the steps of:

determining commutation starting point and ending points which are symmetrically located about a center point of an interval between said first and second transition edges of said zero cross signal;

performing a soft-switching based on said commutation starting and ending points if an motor rotation speed is locked up.

* * * * *